(12) United States Patent
Kane et al.

(10) Patent No.: US 8,937,545 B2
(45) Date of Patent: *Jan. 20, 2015

(54) SYSTEM AND METHOD FOR SITUATIONAL AWARENESS

(71) Applicant: Intrepid Networks, LLC, Clermont, FL (US)

(72) Inventors: Brittin Kane, Clermont, FL (US); Joshua Witter, Orlando, FL (US)

(73) Assignee: Intrepid Networks, LLC, Clermont, FL (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/672,167

(22) Filed: Nov. 8, 2012

(65) Prior Publication Data

US 2014/0125483 A1 May 8, 2014

(51) Int. Cl.
*G08B 1/08* (2006.01)
(52) U.S. Cl.
USPC ............ 340/539.13; 340/539.11; 340/539.21; 340/539.23
(58) Field of Classification Search
USPC ............... 340/539.13, 539.1, 539.11, 539.15, 340/539.21, 539.23, 686.6, 825.49, 825.69
See application file for complete search history.

(56) References Cited

U.S. PATENT DOCUMENTS

| | | | |
|---|---|---|---|
| 4,675,656 A | 6/1987 | Narcisse | |
| 4,785,291 A | 11/1988 | Hawthorne | |
| 5,396,227 A * | 3/1995 | Carroll et al. | 340/573.4 |
| 5,552,772 A * | 9/1996 | Janky et al. | 340/573.4 |
| 7,102,493 B1 * | 9/2006 | Coppinger et al. | 340/426.19 |
| 7,855,935 B1 | 12/2010 | Lauder et al. | |
| 7,936,262 B2 * | 5/2011 | Derrick et al. | 340/539.13 |
| 8,018,334 B1 | 9/2011 | DiMartino et al. | |
| 2008/0101329 A1 | 5/2008 | Richards | |
| 2008/0143582 A1 | 6/2008 | Park et al. | |
| 2008/0174492 A1 | 7/2008 | Kurokawa | |

OTHER PUBLICATIONS

Kleinsmith, "Gunshot Detection Application for Mobile Phones" University of the Western Cape 2010, Sep. 2010, p. 1-20.
GeoSuite, Beacause Every Second Counts, http://www.gdc4s.com/geosuite?taxonomyCat=131, p. 1-2., Apr. 2012.
Dragon Force, Fight Smarter, http://www.drakontas.com/, p. 1-2, Nov. 4, 2012.

* cited by examiner

*Primary Examiner* — Hung T. Nguyen
(74) *Attorney, Agent, or Firm* — Ferdinand M. Romano; Beusse Wolter Sanks & Maire, P.A.

(57) ABSTRACT

A non-transitory computer readable medium containing computer program instructions for monitoring whether persons in a group are each away from an associated vehicle. In one embodiment, the computer system receives an association between each of multiple persons in the group with one of multiple vehicles and automatically receives digital information, derived from measured rf signal strength, indicating whether any one of multiple persons in the group has moved from a first relatively close position with respect to an associated vehicle and farther away from the associated vehicle than the first position. A notification is sent from the computer system to at least one device associated with a person in the group based on received information that a first of said multiple persons is farther away from the associated vehicle than the first relatively close position is from the associated vehicle.

14 Claims, 17 Drawing Sheets

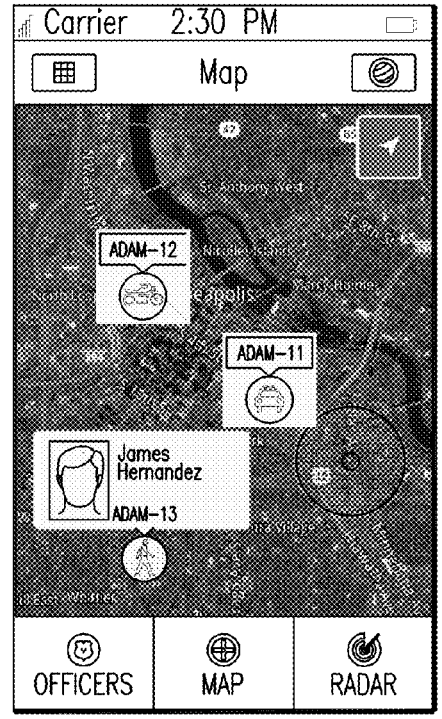
FIG. 5E
FIG. 5F
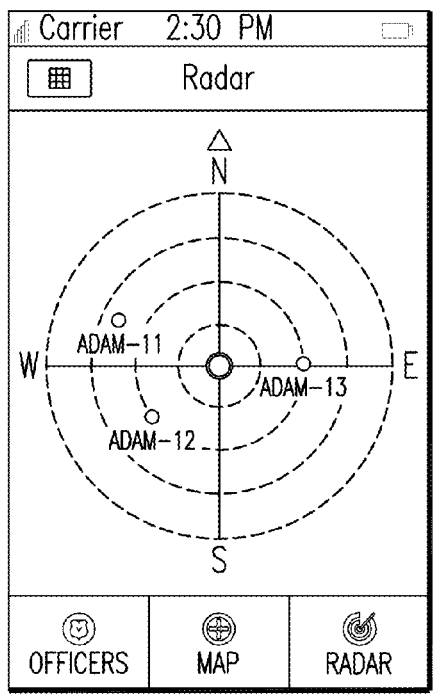
FIG. 5G

SYSTEM AND METHOD FOR SITUATIONAL AWARENESS

RELATED APPLICATIONS

This application is related to each of the following applications filed on the same date as this application and assigned to the assignee of this invention: U.S. application Ser. No. 13/671,961 filed Nov. 8, 2012; U.S. application Ser. No. 13/672,017 filed Nov. 8, 2012; and U.S. application Ser. No. 13/672,105 filed Nov. 8, 2012.

FIELD OF THE INVENTION

The present invention relates to security, safety and situational awareness. In one application the invention enables monitoring and coordination of law enforcement or security personnel based on relative location and availability of personnel.

BACKGROUND

Personnel working in the fields of law enforcement, military operations and security are often engaged in patrolling. While performing routine duties such as monitoring assigned areas, the personnel may travel over a relatively large geographic area with, for example, a motorized vehicle, a bicycle or a horse. The personnel may stop on an impromptu basis, and then exit the vehicle or dismount. Although the personnel typically have a communications link with the central facility, the fact that personnel have made a stop or left a vehicle (e.g., a patrol car) and become engaged in an activity, may not be immediately communicated to the central facility. Greater knowledge of personnel activities can improve, among other things, coordination of operations in an organization.

SUMMARY OF THE INVENTION

The invention is useful in contexts where it is desirable to determine the status, e.g., availability, of an individual during conduct of work activities. Status information is particularly useful to law enforcement and security operations. Awareness of a relative position, by itself, can provide sufficient information about an individual to generate status information. The same status information can be used to create an alert with respect to a potential danger or to remove an existing alert. A feature of the invention is recognition that real time knowledge of when an officer exits or re-enters a patrol car or other type of vehicle (generally referred to as a vehicle) can be had without relying solely on voice communications. The resulting improvement in situational awareness enhances operational efficiencies and coordination of activities.

By receiving alerts as to when an officer leaves a vehicle, a central facility or command center can automatically monitor personnel who are not currently in communication with the command center, become aware that the officer is engaged in an away-from-vehicle activity, and promptly address risks of danger. In one example, an alert indicating that an officer is located external to a patrol car, or has moved more than a minimum distance away from a vehicle, allows a command center officer to determine that a particular officer is not immediately available to respond to another call or incident. It also enables the command center to issue an alert when the officer has been away from the vehicle for longer than a predetermined period of time, thereby raising concern for the safety of personnel.

In one series of embodiments, a non-transitory computer readable medium contains program instructions representing software executable in a central monitoring system comprising a computer system including a microprocessor memory media and storage media and connected to a network. The instructions, when executed by the computer system, cause the computer system to perform method steps for monitoring the status of multiple persons in a group based on distance between a communications device associated with each person and one of multiple vehicles, each person in the group being associated with one of the vehicles, the status being indicative as to whether each person in the group has moved away from an associated vehicle or returned thereto. Each communications device is a first device in a pair of first and second devices, and the first devices are carried by persons in the group while the second devices are each positioned at one of the associated vehicles. The method implemented by the program instruction includes receiving, by a central monitoring system comprising a processor, digital data from at least one member in each pair of devices in communication across a network with the processor of the central monitoring system, and processing the digital data received from the at least one member in each pair of devices, by (i) identifying each communications device in each pair of devices, (ii) associating the communications device in each pair of devices with a person in the group who is assigned to the communications device, and (iii) assimilating location status information from the data received from at least one member in each pair of devices. The data is based on a distance between the devices in each pair derived from strength of a RF signal transmitted from one device in the pair toward the other device in the pair. The location status information is indicative of persons in the group being in a first status when the person associated with the communications device in the pair has moved beyond a predetermined range of distance from the vehicle. Location status information is provided to a display screen to provide notification when a person in the group is in the first status. In one embodiment, the step of receiving digital data, including assimilating the data, is performed periodically to automatically place status information in a database and periodically update the database to provide new status information regarding movement of each person in the group with respect to an associated vehicle. Also in an embodiment of the invention, the outputting of updated location status information to a display screen is performed periodically to provide updated notification of when a person in the group is in the first status.

In another series of embodiments, a non-transitory computer readable medium contains program instructions representing software executable in a central monitoring system comprising a computer system including a microprocessor memory media and storage media and connected to a network. When executed by the computer system, the instructions cause the computer system to perform method steps for monitoring whether one or more persons in a group have each been away from an associated vehicle for longer than a predetermined time period. The method according to the program instructions includes (i) receiving into the computer system an association between each of multiple persons in the group with a vehicle and (ii) automatically receiving into the computer system digital information, derived from measured rf signal strength and sent via the network, indicating whether any one of multiple persons in the group has moved from a first relatively close position with respect to an associated vehicle and farther away from the associated vehicle than the first position. A timer function is initiated in the computer system if the information the computer system receives indicates that a first of said multiple persons in the group has moved farther away from the associated vehicle than the first position.

Updated information is periodically received into the computer system. The updated information is derived from measured rf signal strength and indicates whether the first of said multiple persons remains farther away from the associated vehicle than the first relatively close position or has moved to a position at least as close to the associated vehicle as the first relatively close position. A notification is sent from the computer system to at least one device associated with a second person in the group if, after a predefined time period determined with the timer function, it is determined based on received updated information that the first of said multiple persons remains farther away from the associated vehicle than the first relatively close position. The notification indicates that the first of said multiple persons has remained farther away from the associated vehicle than the first relatively close position during the entire predefined time period.

In another series of embodiments, a non-transitory computer readable medium contains program instructions representing software executable in a central monitoring system comprising a computer system including a microprocessor memory media and storage media and connected to a network. When executed by the computer system, the instructions cause the computer system to perform method steps for monitoring whether persons in a group are each away from an associated vehicle. The method implemented by the program instructions includes receiving into the computer system an association between each of multiple persons in the group with one of multiple vehicles and automatically receiving into the computer system digital information, indicating whether any one of multiple persons in the group has moved from a first relatively close position with respect to an associated vehicle and farther away from the associated vehicle than the first position. The digital information is derived from measured rf signal strength. A notification is sent from the computer system to at least one device associated with a person in the group. The notification is based on received information that a first of said multiple persons is farther away from the associated vehicle than the first relatively close position is from the associated vehicle.

In another series of embodiments, a non-transitory computer readable medium contains program instructions representing software executable in a central monitoring system comprising a computer system including a microprocessor memory media and storage media and connected to a network. The instructions, when executed by the computer system, cause the computer system to perform method steps for providing persons in a group status information and information about the whereabouts of other persons in the group, including whether persons in the group have moved away from an associated vehicle or returned to the vehicle. The method implemented by the program instructions includes periodically receiving into a computer system information derived from measured rf signal strength and automatically sent in digital form via a cellular network from one or more portable devices. The received information indicates whether any of the persons has moved from a first relatively close position with respect to an associated vehicle to beyond the first position and farther away from the associated vehicle than the first position. Also according to the method, location information is received into the computer system, from the portable devices. The location information is sent via the network for multiple ones of the persons. The location information may be based on vehicle position or position of a person when the person is in the first relatively close position with respect to the associated vehicle. Status information is sent from the computer system to each of the portable devices via the cellular network, for graphically indicating the location of each person on a map and indicating on the map whether each person is (i) at a first relatively close position with respect to an associated vehicle or (ii) beyond the first position and farther away from the associated vehicle than the first position. In one embodiment the location information is periodically sent via the network for multiple ones of the persons. The location information may be based on vehicle position. According to an embodiment the status information is periodically sent to provide updates of the status information to each of the portable devices to graphically update the location of each person on a map and indicate on the map whether each person is beyond the first position and farther away from the associated vehicle than the first position.

In another series of embodiments, a non-transitory computer readable medium contains program instructions representing software executable on a computer system of the type having a microprocessor, a memory medium and a storage medium. The instructions, when executed by the computer system, cause the computer system to perform method steps for automatically monitoring or notifying when one or more persons in a group move away from an associated vehicle or return toward the vehicle. The method steps include storing and providing access to modify a database in the computer system which identifies a plurality of portable communications devices, each device configured to exchange data with the computer system. The database associates each portable device with a person in the group assigned to have the device in his or her possession. Further, the position information is received into the data base. The position information is derived from a rf signal strength whenever sent from each portable communications device via the network, and indicates whether the person, having possession of the portable device, has moved a distance away from the associated vehicle. The information received includes data indicating whether each person having possession of one of the portable communications devices is (i) in a first position relatively close to or within the associated vehicle or (ii) has moved away from the associated vehicle to a second position or (iii) has moved from the second position to the first relatively close position. Updated status information is automatically sent from the computer system to at least one device connected to receive data via the network. The updated status information identifies each person in possession of a portable communications device who (i) has moved away from a first position relatively close to or within the associated vehicle to a second position; or (ii) has moved from the second position to the relatively close first position.

BRIEF DESCRIPTION OF THE DRAWINGS

These and other features, aspects, and advantages of the present invention will become better understood when the following detailed description is read with reference to the accompanying drawings in which like characters represent like parts throughout, and wherein:

FIGS. 5A-5I illustrate an exemplary sequence of views on the display of a hand-held device, such as a mobile telephone according to an embodiment of the invention.

In accord with common practice, the various described features are not drawn to scale, but are drawn to emphasize specific features relevant to the invention.

DETAILED DESCRIPTION OF THE INVENTION

Figure 1A:
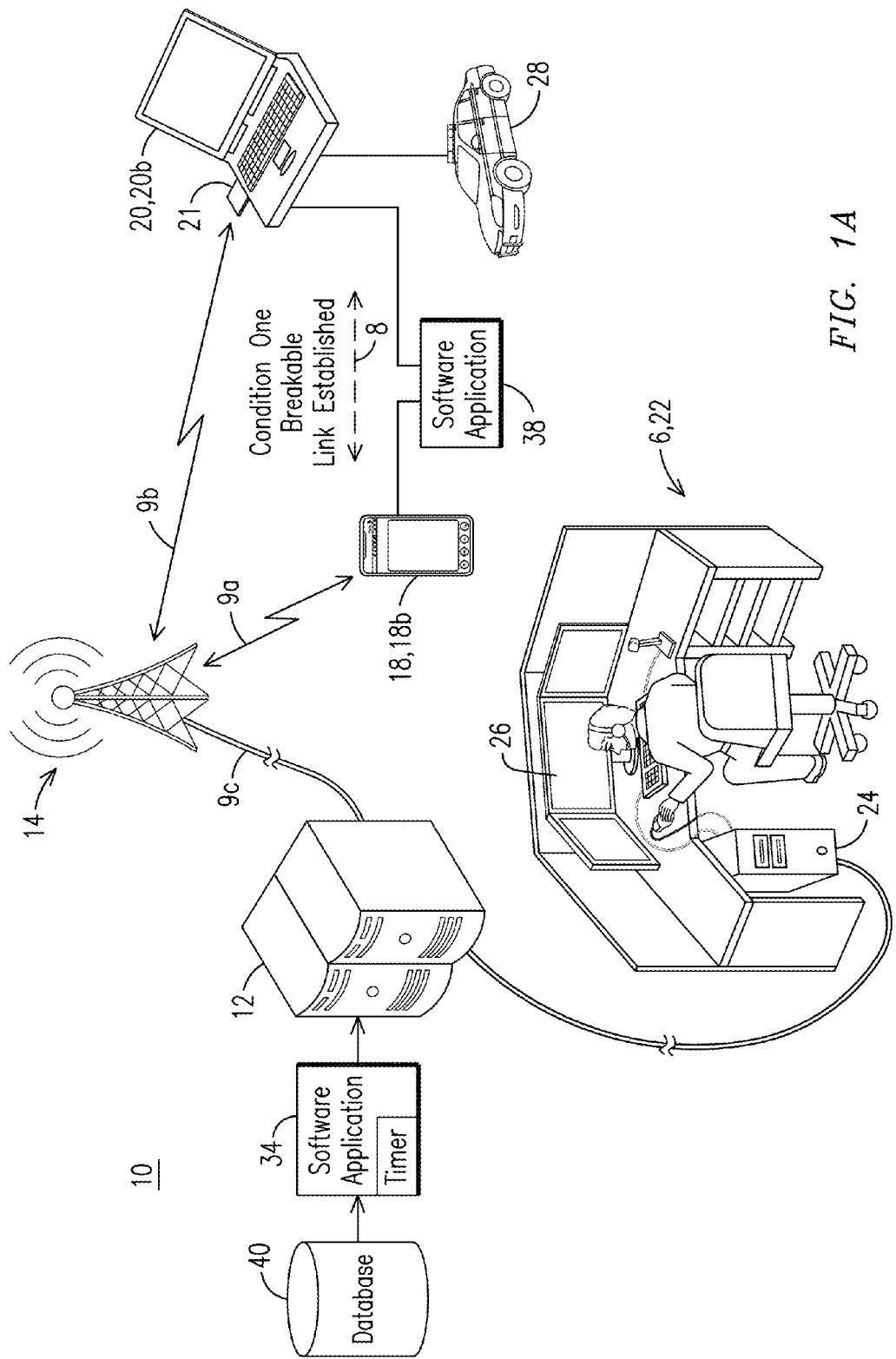
FIG. 1A illustrates a system for improving situational awareness in a law enforcement operation based on provision of a RF link between a portable client device and a stationary device.

FIG. 1A illustrates a system for improving situational awareness in a law enforcement operation based on provision of a breakable wireless radio frequency (RF) link 8 between two devices and a wireless data connection 9a or 9b between each device and a server. Both of the devices may be portable devices. Further, both of the devices may be handheld devices. At least one device serves as a transmitter or beacon which sends a signal to the other device which serves as a receiver.

Various types of wireless signals can be used to form RF links to monitor signal strength as an indication of distance between two devices. Embodiments of the invention are directed to monitoring whether some minimum level of separation exists between the devices based on a measure of signal strength. Precision in determining an actual distance of separation is less critical than providing a high level of confidence and reliability that at least a minimum distance of separation exists. Features of the invention are based on recognition that situational awareness can be improved by determining whether some minimum separation distance exists between two RF devices using an operational frequency and wireless protocol common to the two devices. Such a minimum separation distance need not be determined with great precision. Nor is it necessary to determine the separation distance. Rather, it is recognized that short range wireless signals, e.g., in accord with a Bluetooth technology specification, are useful to provide a level of situational awareness based on some minimum distance of separation between an officer carrying one of the two devices and the other one of the devices.

Under a first condition, referred to as Condition One, the RF link 8 between the two devices is considered established and detected when the receiving device receives a predefined minimum power level. When the link 8 is of sufficient strength to be detected it is referred to as a breakable link. Under a second condition, referred to as Condition Two, when a previously established link no longer exhibits the minimum power level the link 8 is classified as no longer detected. When there is a transition from the Condition One to the Condition Two, the status of the link 8 is referred to as broken. An application in at least one of the devices applies criteria to determine whether a breakable link is broken.

A network 10, associated with a law enforcement operation 6, e.g., a city police department, includes a server 12 linked to cellular system 14. The server is a computer system comprising a processor, memory and storage media. As further described herein, the server houses a database which is written to the storage media loaded into memory and periodically and updated. The system 14, which includes base stations, towers and other typical equipment, is indicated by a tower in the Figures. The cellular system 14 transmits cellular wireless signals to numerous portable devices, including both mobile and stationary devices. The mobile device is a mobile client device. The exemplary mobile client device is a mobile telephone 18 which has a conventional cellular wireless two-way communication link 9a with the cellular system 14. The exemplary stationary device is a portable computer (PC) 20 which also is in two-way communication with the tower 10 via, for example, a conventional wireless modem card 21 with which a wireless two-way communications link 9b is established between the PC and the tower.

In this example, the server 12 is a dedicated component of the network 10, while components of the cellular system, e.g., towers are operated by a commercial provider of telecommunications services. The server 12 is located in or near the command center 22 of the law enforcement operation 6. Staff at the command center 22 perform command, control and communications activities typical of a law enforcement operation. One or more computers or terminals 24 housed in the command center are connected to the server 12 through the network 10. The computers and terminals have conventional human machine interfaces, including a keyboard, a mouse and a monitor display 26. Staff are able to monitor information concerning the status of the breakable link 8, made available from the telephone 18 through the wireless link 9a, over the network 10 and through the server 12 to a personal computer 24 connected to the server 12. The information is provided on the display 26 of a personal computer 24. The mobile telephone 18 and the PC 20 are exemplary of a pair of devices having a breakable wireless link with one another. Specifically, in the example embodiments, these devices 18, 20 each include Bluetooth communications capabilities to establish a one way or a two-way radio frequency (RF) breakable communication link. The telephone 18 includes a Bluetooth transceiver 18b and the PC 20 includes a Bluetooth transceiver 20b. For purposes of conserving power, the telephone 18 may operate in the discovery mode. The PC 20 may only use transmission capabilities while the telephone 18 only uses receive capabilities.

Figure 1B:
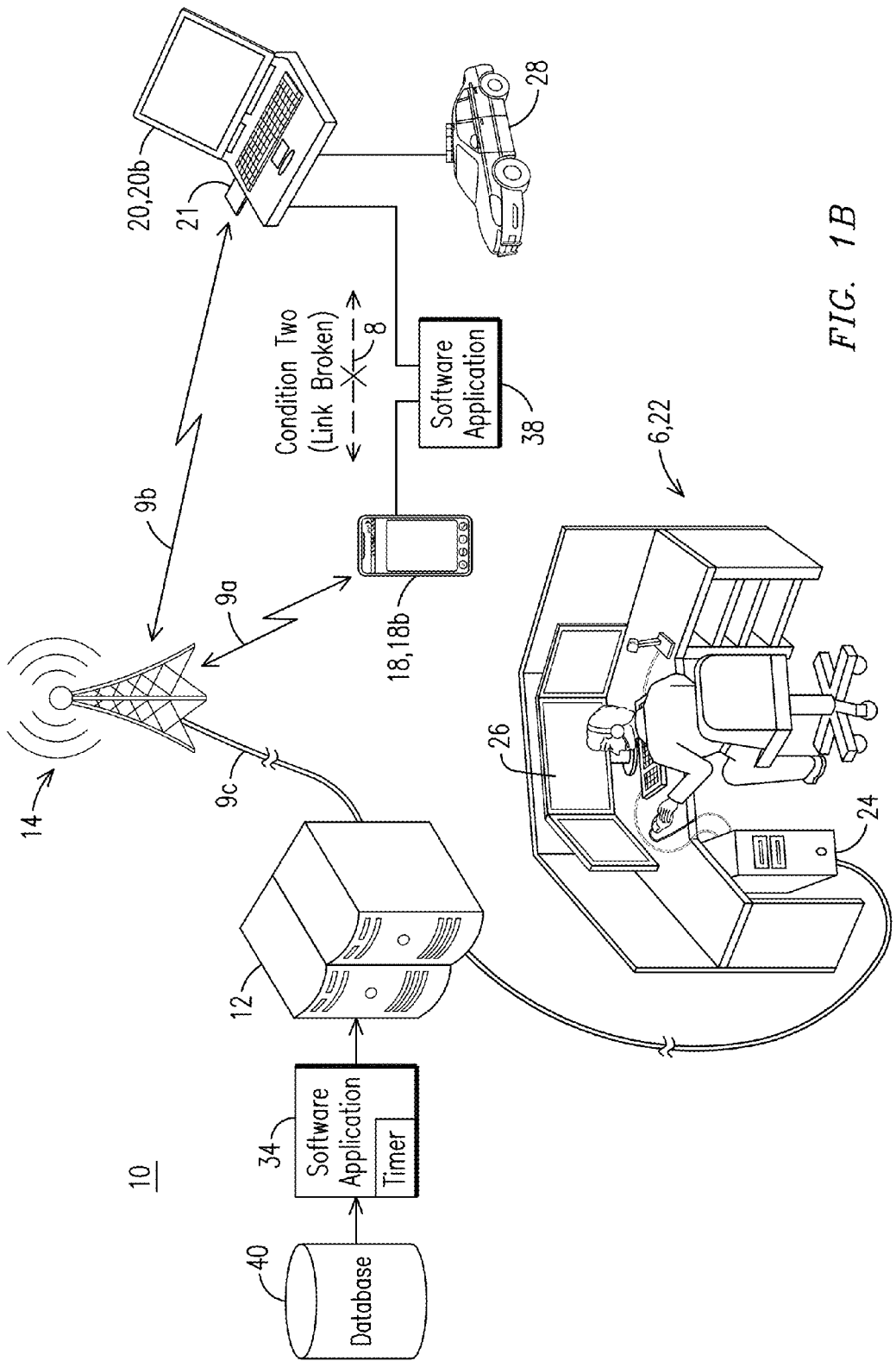
FIG. 1B illustrates the system of FIG. 1A under a condition in which the RF link between the portable device and the stationary device is broken.
Figure 1C:
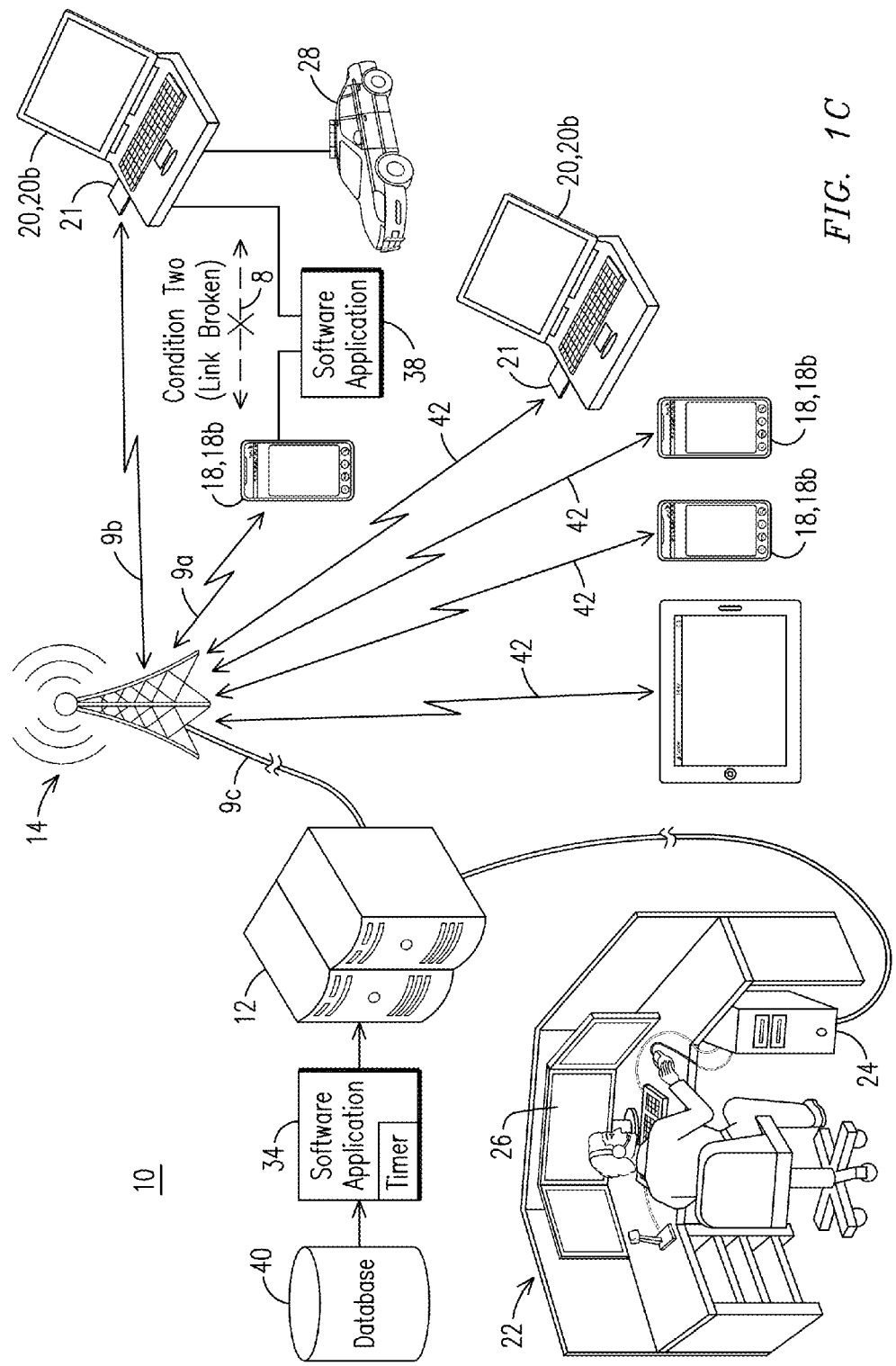
FIGS. 1C and 1D illustrate issuance of alerts by a server under the broken link condition of FIG. 1B.
Figure 1D:
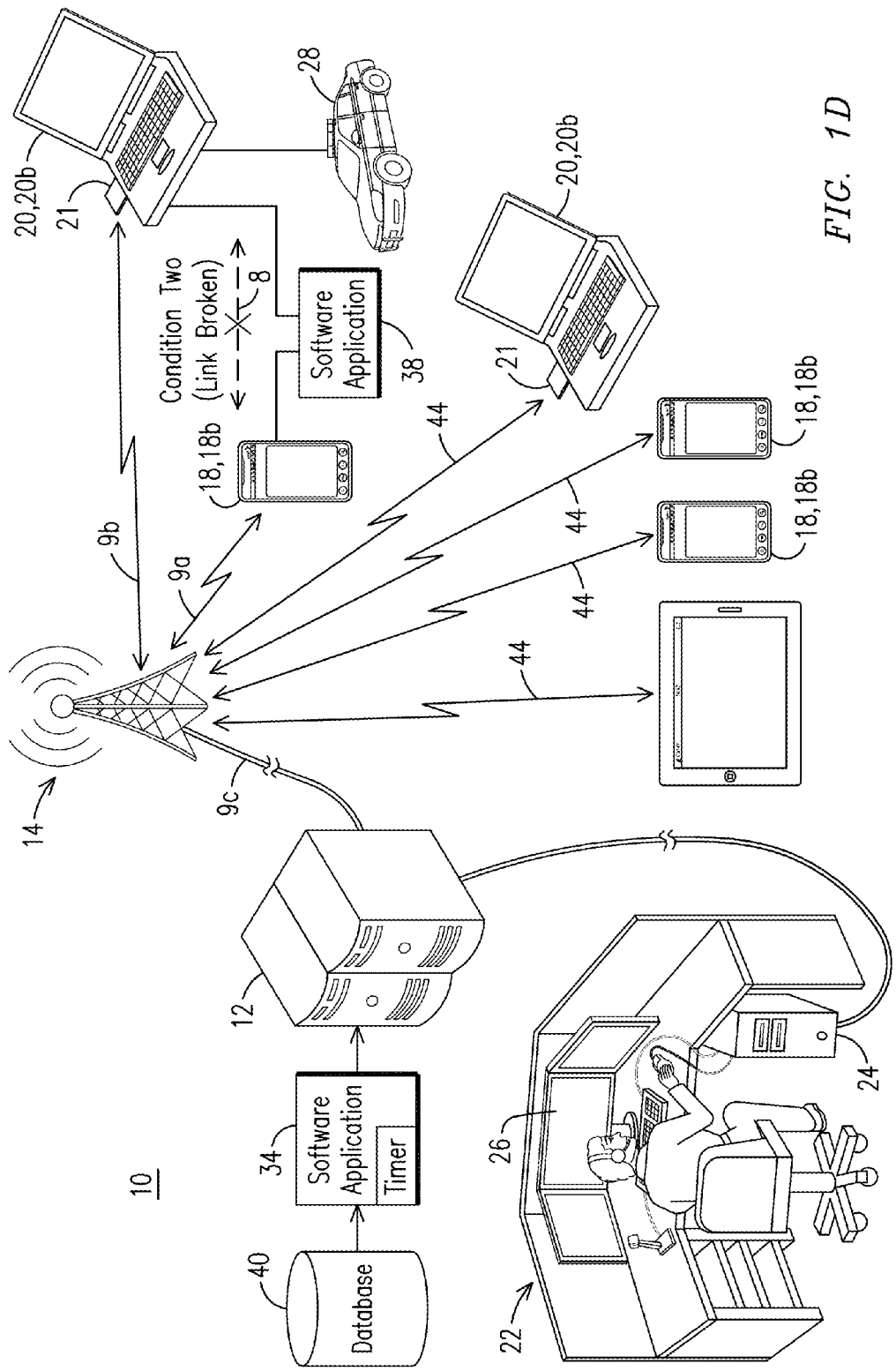

The telephone 18 is illustrated as the mobile client device because it is exemplary of a portable device which an officer can conveniently carry. The PC 20 is illustrated as the stationary device because an officer may be assigned a patrol car vehicle 28 within which such a PC 20 is commonly mounted so that the vehicle is a stationary frame of reference for the PC 20. The fact that the PC 20 is stationary with respect to the vehicle assures that a reference position can be established with respect to the officer's movement away from the vehicle 28. In principle, however, the mobile telephone and the computer system can be interchanged with one another. Moreover, each device 18, 20 may be replaced with another kind of device, including a smart phone or a tablet computer. For example, in lieu of the PC 20, hands-free Bluetooth mobile telephone equipment installed in a vehicle 28, and other Bluetooth equipment which is sufficiently stationary with respect to the vehicle frame of reference can be suitable transmitting devices. In lieu of the PC 20 any Bluetooth transmitting device may be placed in the patrol vehicle 28 and linked to the mobile device (e.g., the telephone 18) to provide a breakable RF link 8. In the illustration of FIG. 1A the Bluetooth RF link 8 is shown to exist between the devices 18, 20, corresponding to a Condition One determination where an officer is present within or close to the vehicle 28. In the illustration of FIG. 1B the Bluetooth RF link 8 between the devices 18, 20, is shown to be broken, corresponding to a Condition Two determination where an officer is out of the vehicle 28 and more than some minimum distance from the vehicle.

In the following description the mobile telephone 18 provides a receiver role with respect to determining whether the link 8 is broken. According to embodiments of the invention, the officer has logged into the network through telephone 18. The telephone 18 is mobile with respect to the vehicle 28 and is carried by the logged in (identified) officer when the officer moves away from the vehicle. The PC 20, providing the role of a stationary transmitter with respect to the vehicle 28, provides a point of reference with respect to movement of the officer carrying the telephone 18 away from the vehicle 20 and the PC 20. It is to be understood that a plurality of vehicles 28 each having a PC 20 may be deployed in the law enforcement operation 6. The illustration of FIG. 1 refers to one particular vehicle 28 to which one officer is assigned and having one PC 20 which is referred to as the PC 20 of interest because it serves as the transmitting device for the breakable link 8 with a particular telephone 18 of interest shown in FIG. 1A.

The mobile device and the PC are "linked" by the receive and transmit functions of the Bluetooth transceivers 18*b* and 20*b*. However, in principle, transmit and receive functions are not needed in each of the devices in order to determine whether or not the breakable link is broken. In practice, the distance between the mobile unit and the PC can be simply monitored based on the signal strength from one transmitter (in the stationary device) to one receiver (in the mobile device), rather than relying on bi-directional data communication between the mobile device and the stationary device. For this embodiment the Bluetooth transceiver of the mobile device may be operating exclusively in the discovery mode.

RF receive circuitry normally consumes much less DC power than transmit circuitry in RF transceiver architectures. Accordingly, the Bluetooth transceiver 20*b* of the PC 20, provides the necessary transmit mode and the Bluetooth transceiver 18*b* of the mobile telephone 18 receives and processes the signal transmitted by the Bluetooth transceiver 20*b*. By relying on only one device to transmit a breakable RF link signal and only relying on the other device to receive the transmitted RF signals, power can be conserved and battery life of the telephone 18 can be maximized. It is advantageous that the PC 20 provide the more power consuming role of a Bluetooth transmitter when, as is typical, the PC 20 is coupled to a DC power source in the vehicle 28 instead of having to rely on the limited capability of a battery to power the PC. Also, the two devices are not programmed to automatically "sync". That is, in the unique context of the invention, syncing of Bluetooth devices may be eliminated to reduce power consumption. Otherwise, in the sync mode, both devices will periodically transmit signals to and receive signals from one another in order to establish and maintain an active communication session. It can also be time consuming for the two Bluetooth devices to perform the associated protocols (e.g., handshakes) to periodically sync with one another. A data communications session is not required to periodically determine whether the officer is outside the vehicle 28. Contrary to normal Bluetooth operations, only the discovery mode need be used by the telephone 18 as this feature can determine whether the status of the link 8 is breakable or broken.

RF signal strength of Bluetooth transmission is generally a function of the distance between transmitter and receiver. Friis' Free Space Law expresses an inverse square relationship between signal strength and the distance between the transmitter and receiver which exists under ideal conditions. The relationship is more complex in multipath environments, e.g., due to presence of reflective surfaces. The actual signal may exhibit behavior quite different from a simple inverse square relationship, having nulls and peaks which are difficult to predict as a result of the multipath combinations. Even though a Bluetooth signal may experience multiple reflections in the environment in or about a vehicle 28, the inventors have found that the RF signal quickly decays as it travels from the transmitter location to a receiver location outside the vehicle. Accordingly, the relationship between signal strength and distance from a Bluetooth transmitter may be relied upon to indicate whether a receiver has exceeded a minimum distance from the transmitter. In part, the invention is based on recognition that a relatively rapid signal decay rate can be observed in signal propagation environments (e.g., within the vehicle 28 or in the immediate vicinity of the vehicle) which are not very predictable. While an environment of multiple reflective paths results in unpredictable signal levels, e.g., due to varied ray paths, the variability in signal strength can be tolerated because sufficient overall signal attenuation occurs over distances of two to six meters such that the actual attenuation can be used to indicate when distance between a source and a receiver exceeds some minimal value. A drop in signal strength below a minimum value can therefore reliably indicate whether the location of the receiving device (e.g., the mobile telephone 18) is outside of and/or some distance away from the vehicle 28.

In one implementation the Bluetooth transmitter of the PC 20 of interest is always transmitting when the PC 20 is operating, and the Bluetooth receiver in the telephone 18 is always in an active mode to receive the signal transmitted from the PC 20 of interest. With the PC 20 acting as a stationary beacon to the mobile telephone, the integrity of system operation requires that the PC 20 of interest not be moved away from the vehicle. When the vehicle is a patrol car, some movement of the PC 20 within the vehicle compartment may be tolerable. On the other hand, movement of the PC 20 to a position which significantly changes signal propagation characteristics should be avoided.

In order to provide reliable information about the condition of a breakable RF link of interest (e.g., between one mobile telephone 18 and one PC 20), it is important that the receiving device discriminate between the signal transmitted from the PC 20 of interest and one or more other signals transmitted from Bluetooth sources other than the PC 20 in a particular vehicle 28. Otherwise, when the mobile telephone is positioned a sufficient distance from the PC 20 to break the link of interest, the telephone 18 may indicate otherwise, i.e., providing a false positive indication of a Condition One based on an unintended receipt of a relatively strong signal from a different Bluetooth transmitting source.

One method of discriminating between receipt of an intended RF signal and other signals is to identify the intended signal based on the MAC address of the PC 20 of interest. More generally, the telephone 18 may be provided with a listing of MAC addresses for all PC's deployed in all vehicles 28 in the particular law enforcement operation 6. The listing of addresses includes an association of the MAC address of each PC 20 with a specific vehicle 28 in which it is positioned. The telephone, operating in the discovery mode, can check each MAC address for which there is a signal that exceeds a specified minimum power level and then identify the signal as being of the first condition, i.e., detectable, in accord with Condition One, along with an identification of the associated vehicle 28. The listing of MAC addresses may be downloaded to memory or storage media in the telephone 18 or the telephone 18 may access the information from the server 12.

A feature of using such a look-up table is that the method can be reliably deployed to identify the second condition, i.e., a Condition Two (e.g., in which a breakable link previously found to be a Condition One has transitioned to being a broken link) in a variety of situations. For example, the method can be readily applied when multiple officers have entered the same vehicle 28 even through the particular vehicle is only assigned to one of several officers. When multiple officers are simultaneously in the same patrol vehicle, the method can assure there is a responsive link between each of multiple telephones 18 assigned to different officers and the one PC 20 of interest having a MAC address assigned to that same vehicle. Consequently, movement of each officer out of the vehicle 28 can be detected. Further, after the responsive link is assigned between the PC 20 in one vehicle (based on a temporary presence of an officer in or near that vehicle), subsequent movement of that officer out of that one vehicle and into another vehicle results in establishment of a new link between the same telephone 18 and a PC 20 having a different MAC address.

The method provides situational awareness of whether and when an officer moves between patrol vehicles. For example, it is possible to know whether an officer has simply exited a patrol car or has moved from one patrol car to a different patrol car. Based on changes in MAC addresses, the method provides knowledge of which patrol vehicle an officer is in or near, even though the officer has moved away from an assigned vehicle.

Most devices which receive Bluetooth RF signals have a Receive Signal Strength Indicator (RSSI) which is an indication of an RF received power level, i.e., a measurement of the power of a signal received from another Bluetooth device. For embodiments of the invention this indicator is used to determine when the officer is out of the patrol vehicle 28. In one embodiment RSSI values can be monitored to determine whether the signal strength has diminished to a level which is effectively "no signal" as might be indicated by a threshold level drop in signal power by, for example, 80 dB. According to such an embodiment, when an officer has exited the vehicle 28, the RSSI value can be relied upon to decay substantially, e.g., by 80 dB. This drop in RSSI value is referred as a "link broken" condition or a broken link.

The exemplary 80 dB threshold decay may be based on a predetermined and typical RSSI decay value observed for all PC's 20 in the law enforcement operation 6. Alternately, the threshold decay level may be based on a signal power drop relative to a RSSI value registered when the telephone 18 is located inside of a patrol car. Although a decay of 80 dB may be used as a criterion in the illustrated embodiments to establish existence of a broken link 8, other levels of decay can be used as the criterion for determining whether there is a broken link 8, e.g., RSSI level drops of 40, 50, 60, 70, 90 or 100 or more dB. Further, other metrics than RSSI may be used to establish whether there is a broken link. Also, when the vehicle 20 is not a patrol car (e.g., the vehicle 20 may be a motorcycle) a smaller decay threshold may be suitable to indicate that the officer has walked a minimum distance away from the vehicle, e.g., two to six meters.

In applications which monitor whether an officer is outside of a patrol car, the distance at which the RSSI value decays by 80 dB can be in the range of 2-3.5 meters, depending on the physical properties of the transmission path between the transmitter and receiver. For example, propagation and attenuation characteristics may vary depending on whether vehicle windows are tinted, and whether roll-up windows are in up or down positions, and environmental conditions. For example, precipitation can alter the rate of attenuation of a wireless RF signal. When the RSSI value increases from the exemplary 80 dB threshold of decay, the link is deemed to be re-established and it is assumed that the officer is either positioned inside the vehicle or close to the vehicle. Receiving such a signal may be interpreted as an indication that the officer is not presently handling a policing matter or that the officer is near the safety of his vehicle and is available to respond to a request or receive instructions from the command center 22.

The server 12 hosts a first application 34 for monitoring the status of the breakable link in coordination with a second application 38 running on the mobile telephone 18. The second application programs the telephone 18 to communicate with the server 12, via a wireless link 9a and the cellular system 14 and the internet. Communications between the telephone 18 and the server 12 include transfer of information relating to the status of the link 8. The telephone 18 may also receive other information from the server 12, such as alerts regarding the status of other links between other telephones or hand held devices and stationary Bluetooth devices in other vehicles 28, e.g., other PCs 20. As long as the mobile telephone has a wireless connection to the internet, the status of the breakable link 8 (i.e., whether Condition One or Condition Two exists) is relayed to the server 12 and can be monitored by staff on the display 26 at the command center 22.

In one implementation the mobile client device, e.g., the telephone 18 or a different type of Bluetooth enabled hand held device, is also GPS enabled. The application 38 running on the mobile device obtains position data which is provided to the server application 34 via the wireless link 9a, in conjunction with the status of the breakable link to identify the location of the officer. The server 12 then graphically displays in real time both the officer location and the location of the vehicle 28 on a map shown on the display 26 of the computer 24 in the command center 22. For example, the screen of the display 26 may show only one icon, corresponding to the vehicle 28, when the officer is inside the vehicle, and show two icons when the officer has exited the vehicle, with one icon representing the vehicle 28 and the other icon representing the officer positioned outside the vehicle. In another embodiment, two different colored icons may be used to display the vehicle, depending on the state of the breakable link, e.g., blue for when the officer is inside the vehicle 28 and red for when the officer is out of the vehicle.

According to a power conserving option, with the GPS receiver used to indicate an actual position of the officer (or a distance between the officer and the vehicle), both the GPS receiver and the Bluetooth receiver in the mobile telephone 18 may be turned off when the officer is more than a minimum distance from the vehicle, e.g., at least four meters from the vehicle. Another advantageous feature, resulting from continual provision of position data in conjunction with the status of the breakable link to the server application 34, is that the location of the vehicle 28 can be determined based on, for example, comparison of position data acquired immediately before the link 8 is broken with position data acquired after the link 8 is broken. Further, the relative distance between the vehicle and the officer in possession of the mobile telephone 18 can be determined.

When the RF link 8 is broken the server application 34 can initiate operation of an electronic timer. Timer operations may reside in the telephone 18, in the server 12 and even in the personal computer 24. For example, the timer may be a simple subroutine function in the mobile device application 38 or the server application 34 which includes a counter function based on a clock signal. Output from the timer can be communicated from one device to another device over the network 10. Timer functions are useful for periodically acquiring link status information, position information and determining whether an officer is away from a vehicle more than a pre-determined time. As alert is generated when the lapsed time exceeds the predetermined value, based on an assumption that if the officer does not return to the vehicle within the predetermined time period there is reason to suspect that the officer may be in trouble. The alert may originate in the server 12 of the personal computer 24 or may otherwise be sent to the command center 22 or the server for dissemination to other officers. The alert may be sent to a selected array of devices (e.g., PCs in other vehicles 28 and hand-held devices such as mobile telephones carried by other officers). However, when the officer re-enters the vehicle 28, as confirmed by the link exhibiting at least the minimum power required for a Condition One, the timer operation is canceled and an update is broadcast to a selected array of client devices to communicate to other officers that the alert is removed. Command center personnel at various locations could have authority to remove the alert remotely if it is determined that the officer is not in any peril requiring a response.

According to a general method implemented in the exemplary law enforcement operation 6 shown in FIG. 1, the Bluetooth wireless link 8 is established between the PC 20 of interest and the mobile telephone 18 wherein the PC 20 provides the necessary transmitter function to beacon a signal within and outside of the vehicle 28. Based on the signal attenuation characteristics, the useful Bluetooth transmission distance of the signal is limited to distances relatively close to the vehicle, e.g., a few meters. Consequently, when the vehicle is a patrol car and the mobile telephone 18 is located in a vehicle 28, the application 38 running on the telephone 18 periodically provides Condition One notifications to the server 12 that the RF link is operational, i.e., that the receiving device (e.g., the telephone 18) is receiving a predefined minimum power level.

Because the telephone is normally carried by the officer, when the officer steps out of the vehicle 28 and moves away from the vehicle, the telephone 18 is carried away from the vehicle 28. Thus at some threshold distance of separation between the telephone and the vehicle 28, the wireless link 8 between the telephone 18 and the PC 20 breaks. That is, the RSSI level decays to or below a predetermined value. When this happens the application 38 running in the telephone 18 notifies the application 34 running in the server 12 of a Condition Two determination, that the previously established breakable link 8 is considered broken because it no longer exhibits a minimum power level. See, again, FIG. 1B. Subsequently the timer routine is initiated by the application 38. As long as the link 8 is broken, the Condition Two notification remains, i.e., a flag is set, indicating that the previously existing link 8 remains broken and the timer value is continuously updated until the flag is removed. Whenever the server 12 receives a notification that there has been a transition between Condition One and Condition Two, the server 12 updates status information relating to the officer and the patrol vehicle 28 in a data base 40. For each transition from Condition One to Condition Two, the server 12 provides this information for viewing on the display 26 to notify staff at the command center 22 of the current status of the officer. Following a Condition Two determination, and initiation of the timer routine, when the timer reaches a predetermined threshold, the server also broadcasts an alert 42 to all stationary devices (e.g., PCs 20) positioned in all vehicles 28 and to all hand held devices (e.g., mobile telephones 18) carried by officers in the law enforcement operation 6. See FIG. 1C. The alert 42 is a cancelable notification that the officer associated with the hand held device (e.g., telephone 18) is outside of or away from the vehicle 28. The alert 42 is only sent when the time exceeds a certain threshold. The map and timer are periodically updated on all telephones 18 to provide continual situational awareness.

For each transition from Condition Two back to Condition One, the server broadcasts a cancelation of the alert 42 to all stationary devices and all hand held devices. The cancelation of the alert 42 indicates that the officer has returned to or entered into the vehicle 28. As noted, when the RF link 8 is broken an electronic timer can be started. For example, at the time the alert 42 is sent to the server 12 at the command center 22 the timer can be initiated by the server application 34. If the lapsed time exceeds a predetermined value before the alert 42 is canceled, the server provides this information as a higher level alert 44 on the display 26 to notify staff at the command center 22 of a potential danger or risk of safety to the officer associated with the alert 42, and the server also broadcasts (initiates) the higher level alert 44 to all stationary devices and all hand held devices carried by officers in the law enforcement operation 6. See FIG. 1D. In other implementations, the alerts 42 and 44 may each be broadcast to selected sub-arrays of devices. For example, alerts may only be made available through hand-held client devices being carried by those officers who are, at the time, within a given distance from the location of the vehicle 28 associated with the alerts 42 and 44.

Figure 2A:
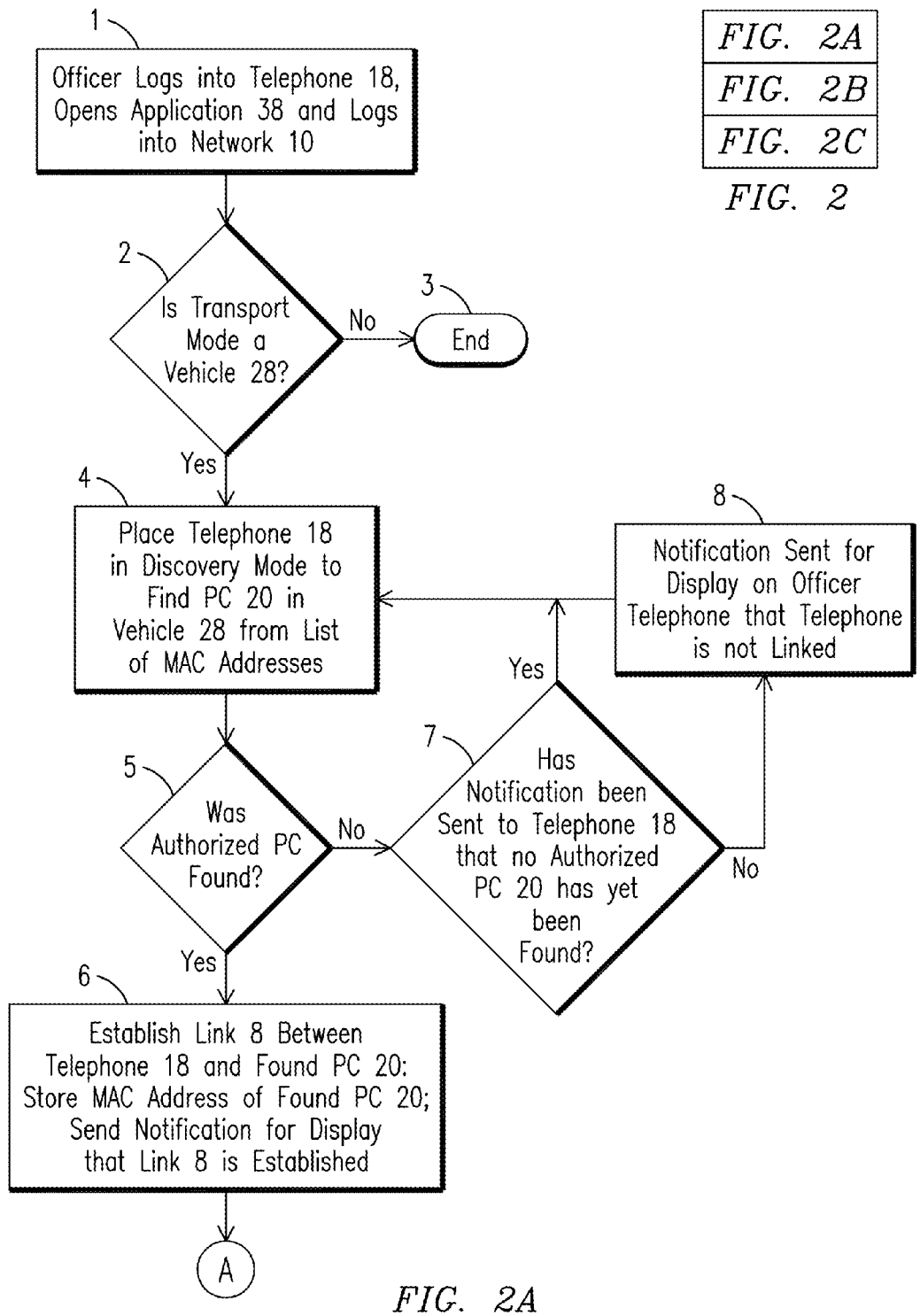
FIGS. 2A-2C illustrate a log-in sequence, a monitoring routine and a log-off sequence in a method according to the invention.
Figure 2B:
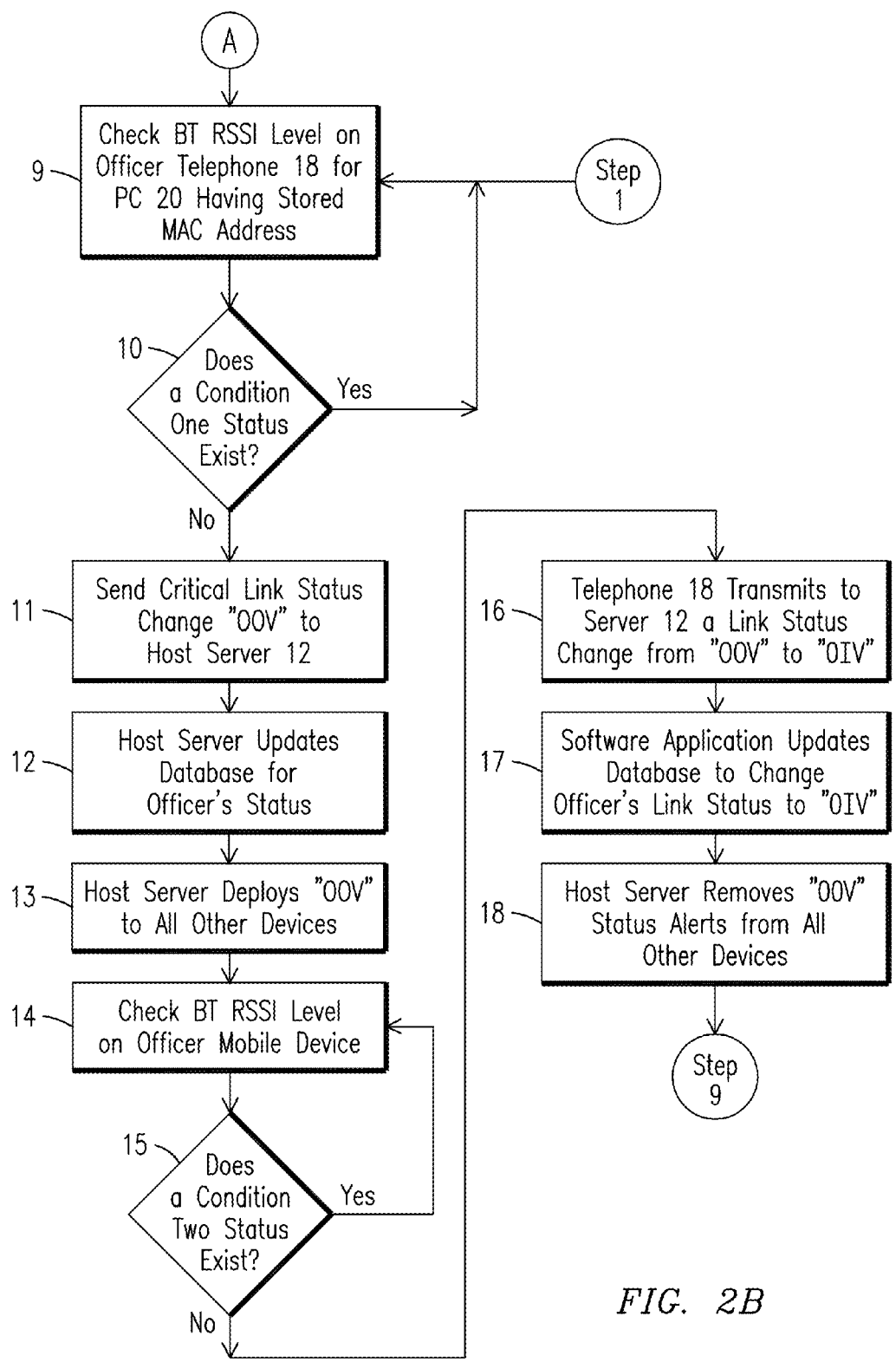
Figure 2C:
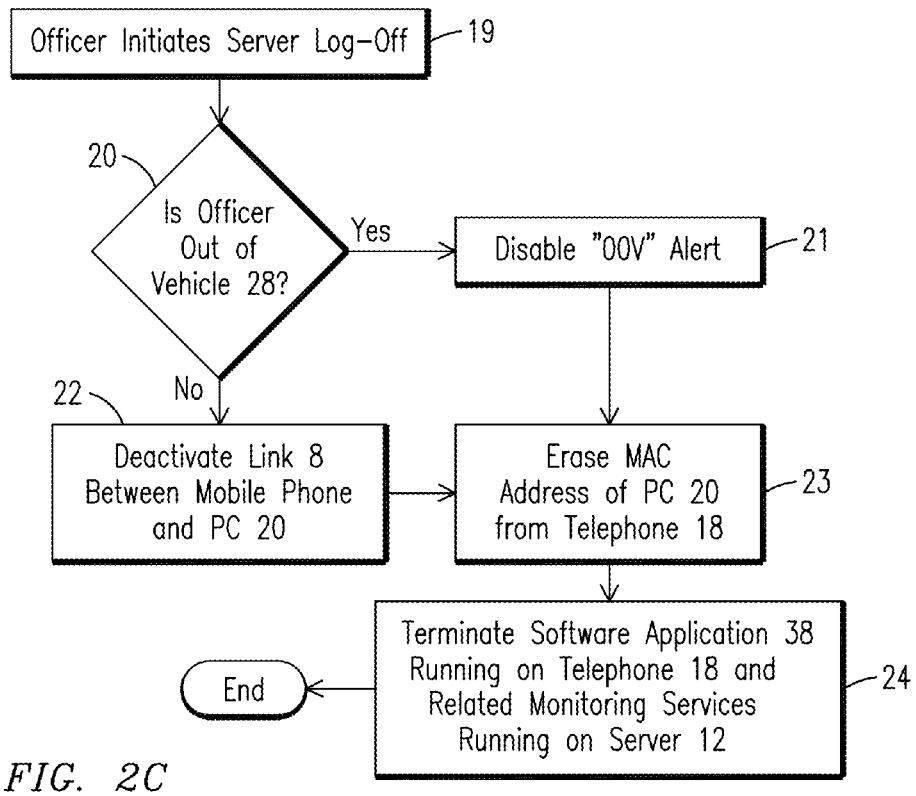

FIGS. 2A-2C illustrate a log-in sequence, a monitoring routine and a log-off sequence according to a method of the invention in the network 10. The term log-in refers to a common computer security process in which a user logs in or on or signs in or on to, for example, a computer system, by which process the user attains individual access to the system or to an application or a specific page. The log-in process may include both identification and authentication of the user based on credentials. A user can also log out or off to remove access to the page, application or system.

With reference to FIG. 2A, an officer initially logs into the telephone 18, opens the application 38 and logs into the network 10 through the application 38 running on the mobile telephone 18 (Step 1). Log-in to the server occurs, for example, when the officer comes on duty or assumes operation of a vehicle 28. The log-in sequence queries the user as to whether the mode of transportation will be a vehicle 28 having a known MAC Address for a RF device suitable for establishing the breakable link 8, such as a patrol car (Step 2). If the officer response is negative, the log-in ends (Step 3). If the officer response is affirmative, the application 38 places the telephone 18 in the Bluetooth Discovery Mode (Step 4) in order to find a Bluetooth signal from a PC 20 or other stationary device within in the vehicle 28 and which is included on the list of authorized Bluetooth MAC addresses in the data base 40. If, in response to an inquiry as to whether an authorized Bluetooth MAC address is found (Step 5), there is an affirmative determination, then (Step 6) the mobile telephone 18 stores the Bluetooth MAC address of the PC 20 or other device which is in the particular vehicle 28 being used by the officer. If no authorized MAC address is identified by the mobile telephone 18, the application checks to determine whether a notification has already been sent to the display of the telephone 18 to advise the officer that no authorized PC 20 has yet been found (Step 7). If no such notification has been sent to the telephone display a notification is sent to the display to advise the officer that the telephone 18 is not yet linked to any Bluetooth enabled device having an authorized MAC address (Step 8). After the notification is sent (Step 8) the application cycles through Steps 4, 5 and 7 until a PC having an authorized MAC address is found. Once an acceptable PC 20 has been identified, a link 8 is established and the application 38 stores the MAC address of the PC 20 which has the link with the telephone 18 (Step 6).

Referring next to FIG. 2B, with the link 8 established, the telephone 18 cyclically checks the Bluetooth RSSI level for the PC 20 having the stored MAC address (Step 9) and so long as the signal power remains at least 80 dB above a minimum value, e.g., a threshold power level, the application provides a determination that the Condition One status exists. To effect this determination, an inquiry is periodically made as to whether the RSSI level of the link 8 has dropped at least 80 dB, e.g., relative to a RSSI value registered when the telephone 18 is located inside of a patrol car. (Step 10) In other implementations, the 80 dB drop may be relative to a prior measured RSSI level or relative to some average RSSI level. The RSSI value is continually updated on the telephone 18. It may be an intrinsic value generated by circuitry which provides the Bluetooth functionality. If the RSSI level has not undertaken, for example, an 80 dB drop the periodic inquiries continue. If the RSSI level does drop by, for example, at least 80 dB, the telephone 18 transmits a command to the server 12 to update the status information (Step 11) concerning the officer. In response the server changes the status of the officer in the data base 40 from an "Officer in Vehicle" (OIV) Condition One status to an "Officer Out of Vehicle" (OOV) Condition Two status (Step 12). The server 12 also broadcasts the "Officer Out of Vehicle" Condition Two status to all stationary devices and all hand held devices carried by officers in the law enforcement operation 6 (Step 13).

While the OOV Condition Two status exists, the application 38 running in the telephone 18 continues to periodically check the RSSI level of the Bluetooth signal received from the MAC address of the authorized PC 20 (Step 14). The application determines whether the RSSI level has increased to a level above the previously observed drop in signal power level of, for example, at least 80 dB (Step 15). If there has not been a recovery which brings the signal power level above the previously observed drop of at least 80 dB, the application continues to periodically check the RSSI level (Step 14) and determine whether the RSSI level has increased to a level above the previously observed drop in signal power level of at least 80 dB (Step 15). If there is a determination that the RSSI level has increased above the previously observed power level drop of at least 80 dB, the phone 18 transmits a command (Step 16) to the server 12 to change the status of the officer, in response to which the server updates the data base 40 (Step 17) from an OOV Condition Two status to an OIV Condition One status. When the Condition Two status transitions to the Condition One status the server 12 also cancels any Condition Two status alerts 42 which were broadcasted to the stationary devices and hand held devices carried by officers in the law enforcement operation 6 (Step 18). After step 18, the cyclic monitoring process then continues at Step 9. In an alternate embodiment, the application 38 implements Step 15 to determine whether there is a transition from Condition Two to Condition One by determining whether the RSSI level has increased to a level at least 10 dB above the previously observed drop in signal power level of at least 80 dB. That is, according to the alternate embodiment, a threshold measured RSSI value required for transition from Condition Two to Condition One is 10 dB higher than the threshold measured value required for transition from Condition One to Condition Two. Having a somewhat higher transition threshold for recovery to Condition One helps avoid an intermittent fluctuation around the 80 dB, e.g., if the officer is still outside of a patrol car in which the PC 20 is situated.

Referring next to FIG. 2C, when the officer logs off of the server 12 (Step 19) the system queries whether the officer is out of the vehicle 28 at the time of log-off (Step 20). If the officer is out of the vehicle 28 at the time of logging off of the server 12, any existing alerts 42, 44 are canceled (Step 21). If the officer is in the vehicle 28 when logging off of the server 12, there is an OIV Condition One link status and the link 8 is deactivated (Step 22). In any case, after logging-off of the server, the MAC address of the PC 20 (or other Bluetooth device) in the vehicle with which the link 8 is established is removed from the telephone 18 (Step 23). The application 38 and related services are then terminated (Step 24).

Generally, there has been described a method for determining the position or location of a person relative to a rf source positioned, for example, in a vehicle. A series of embodiments employs at least three devices: (i) a mobile client device such as the telephone 18, running the software application 38, also referred to as mobile client software; (ii) a device, stationary relative to a vehicle frame of reference, such as the PC 20, which transmits rf signals for receipt by the client device, and (iii) a server such as the server 12, which runs the software application 34 to improve situational awareness of deployed officers by exchanging information with the mobile client devices, e.g., via a network including a cellular telephone system. There are two states that can be assigned to the mobile client device: the Officer In vehicle (OIV), Condition One, in which the client device is in or proximate the vehicle or very close to the stationary device; and the Officer Out of Vehicle (OOV) Condition Two, in which the client device is relatively far from the stationary device. In the context of the described law enforcement operation, a Condition Two at least results in an Alert 44 which is a first notification that an officer is away from a vehicle. A Condition Two may also result in a second Alert 48 which notifies others that the officer has been away from the vehicle for longer than a predetermined time period, thereby alerting personnel that the officer may be having trouble.

In an embodiment applicable to the afore described law enforcement operation 4, the method for determining the position or location of an officer relative to a vehicle 28 (or a stationary rf source in the vehicle) is performed in the network 10, with the software application 34 running on the server 12 and the software application 38 running on each client device (e.g., telephones 18 or other hand held devices) which officers on duty have used to log into the network 10. A series of component processes is illustrated in FIG. 3. Each of the client devices logged into the server 12 periodically provides updates to the server 12 regarding the status of the officer, i.e., whether the officer is in an OIV Condition One state or an OOV Condition Two state. Each time an update is received the server writes the periodically provided status information to memory and to the database 40. The server 12 also broadcasts information (e.g., in the form of alerts 44 or removal of alerts), regarding transitions between OIV and OOV conditions for each officer who has logged into the server application 34. Whenever the server receives information that an OOV Condition Two exists for any officer, the server application 34 initiates a timer function for that officer. If the link for an officer is determined to be in a Condition Two OOV status for a lapsed time which exceeds a predefined period, as measured with the timer, an alert 48 is broadcasted through the network. On the other hand, whenever the status of an officer reverts from an OOV Condition Two to an OIV Condition One, and the predefined time period has not yet lapsed, operation of the associated timer function is canceled.

For each client device logged into the software application 34, the client device utilizes a second timer function running, for example, on the client device, to periodically request from the server application 34 at, for example, three second intervals, a most current list of other mobile client devices and/or names of officers associated with other mobile client devices that are within a measured distance or within a defined zone. The server then issues a message containing the requested list of officers. In addition to the names of officers, the list may also include locations (e.g., based on GPS location data) of the officers and a most recently updated link status for each officer (e.g., as to whether the link status of the listed officer is a Condition One or a Condition Two). Once each mobile client receives the list of nearby officer information, the client device updates an internal list of officers based on the received information. If the application 34 running on the mobile device provides for graphic display of nearby officers (e.g., on a geographic map), the status of each officer is indicated in the form of icons or other means to show, for example, an OOV status.

Several subroutines according to exemplary implementations of the inventive concepts are illustrated in simplified flow charts shown in FIGS. 3 and 4. Although the subroutines are illustrated as discrete functional blocks, such representations are provided to illustrate functionality. Actual implementations may be had in numerous combinations including integration of specific functions or tasks that are illustrated in different flow charts. The example assumes that multiple officers are simultaneously logged into mobile client devices and the applications 34 and 38 are continuously running on the client devices and the server, respectively. With reference to FIG. 3A, a process for monitoring situational awareness is initiated in each client device with an officer performing a secure login process as summarized in subroutine 310. Each officer uses an assigned mobile client device (e.g., a telephone 18) to simultaneously log into the client device and the server 12 via the network 10. Once the officer is logged into the network server, multiple client functions are initiated on the client device in cooperation or coordination with functions running in the server application 34. Subroutines 320, 330, 340, 350, 410 and 420 are exemplary of functionality implemented by the applications 34 and 38.

Figure 3A:
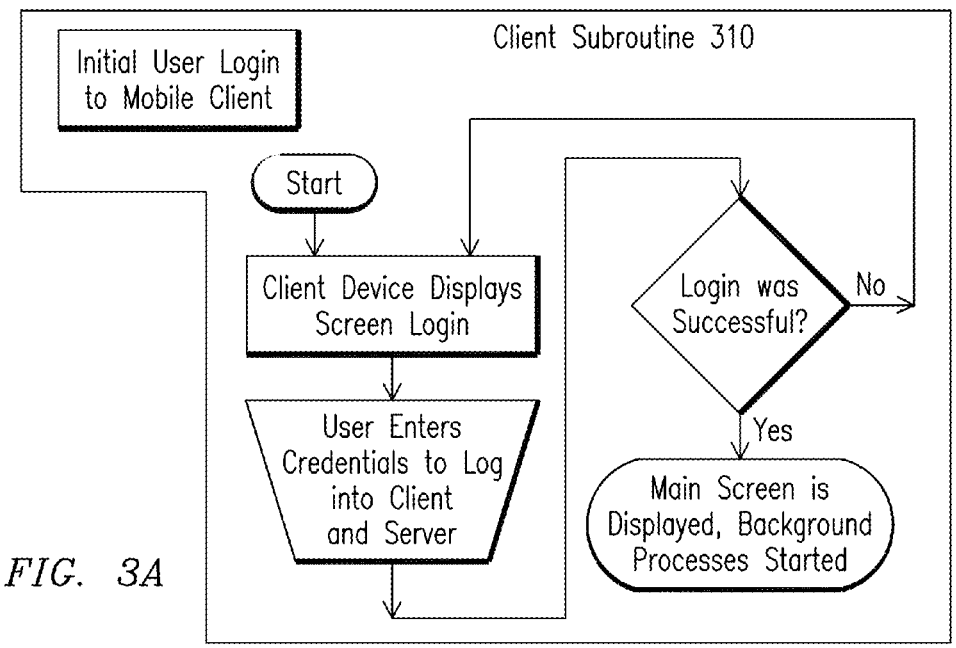
FIGS. 3A-3E are simplified flow charts illustrating subroutine functions performed on the portable client device.
Figure 3B:
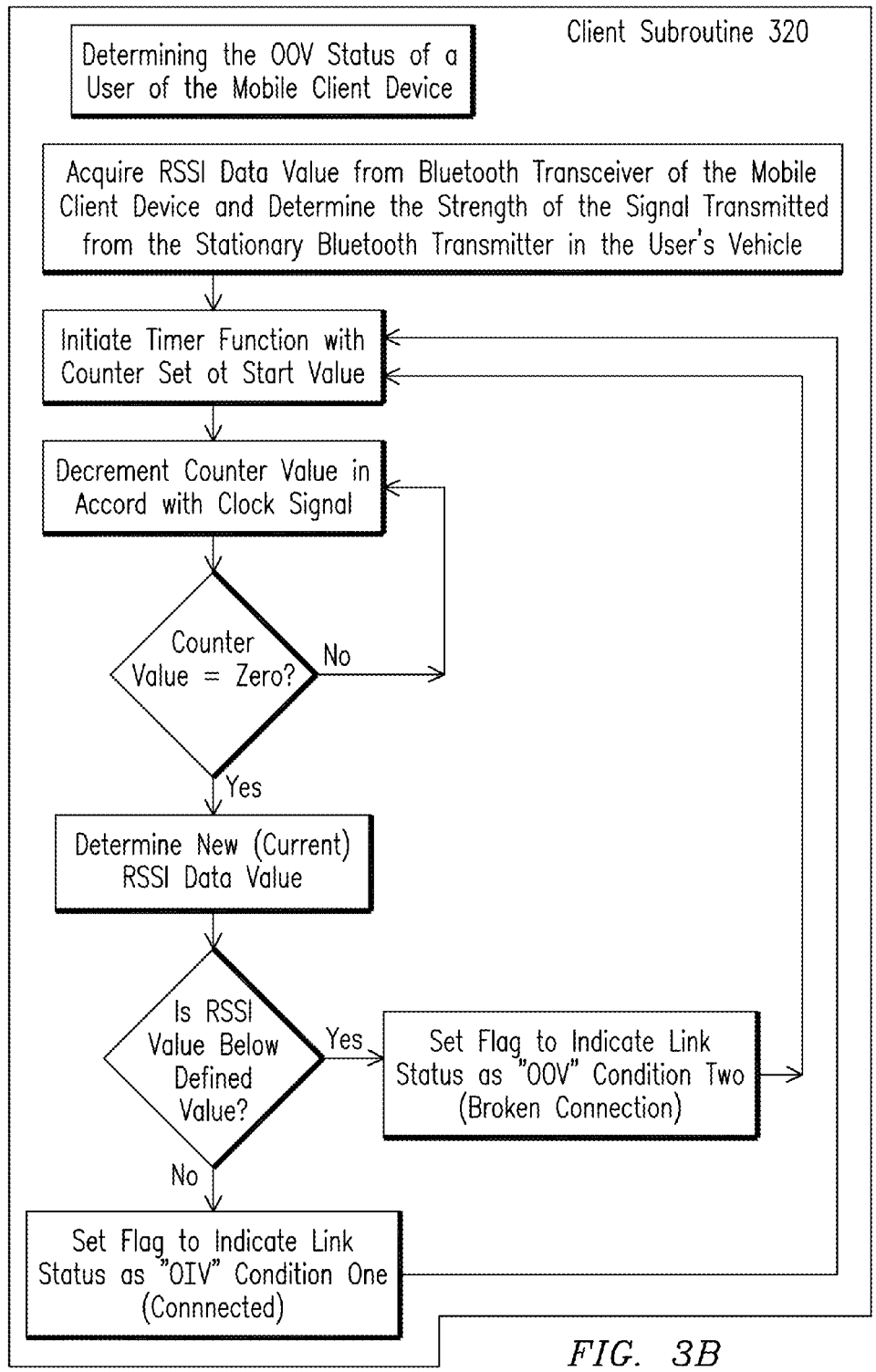

Client subroutine 320, shown in FIG. 3B, runs on the client device to continually determine the status of the breakable link 8. See, also, client subroutines 330, 340 shown in FIGS. 3C and 3D, and server subroutine 410 illustrated in FIG. 4A. Link status determinations and officer location information are periodically updated in memory or storage locations (internal state) in the mobile client device. The client device accesses this data to report the updated status determinations and location information to the application 34 running on the server 12. With further reference to FIG. 3B, after the mobile client device is logged in to the server under a Condition One, a value of the RSSI level associated with the Bluetooth signal transmitted from the officer's vehicle, as measured by the client device, is read from the Bluetooth circuitry. The value may be referred to as a pre-existing value if it is used as a level relative to which signal decay is measured when the mobile client device is moved away from the officer's vehicle in which the stationary rf transmitting device (e.g., a PC 20) is fixedly positioned. A timer function is also initiated in the mobile client device. The timer function periodically resets to a counter start value and is decremented in accord with a clock signal to, for example, periodically indicate lapsed time periods of sixty second duration. Each time the counter value reaches zero, indicating that a predefined time interval (e.g., sixty seconds) has lapsed, a comparison is made between the pre-existing value and a newly acquired RSSI value of the Bluetooth signal transmitted from the officer's vehicle, as measured by the client device. The pre-existing value may be a value other than the RSSI value measured immediately after the client device is logged in to the server under a Condition One. The difference between the pre-existing value and the newly updated RSSI value is used to determine whether a Condition Two (broken link status) exists. The criterion for establishing that a Condition Two exists is whether the most recently measured RSSI level is less than or equal to a defined minimum value which is based in part on the pre-existing value. If the difference between the most recently measured RSSI level and the pre-existing value exceeds the defined minimum value, the OOV Condition Two is deemed established. Summarily, the difference between the pre-existing value and the newly updated RSSI value of the Bluetooth signal may be compared to the threshold value to determine whether an OIV Condition One or and OOV Condition Two link status exists. Each time the difference is computed and the link status is determined, the subroutine 320 sets a flag indicative of the determination.

Figure 3C:
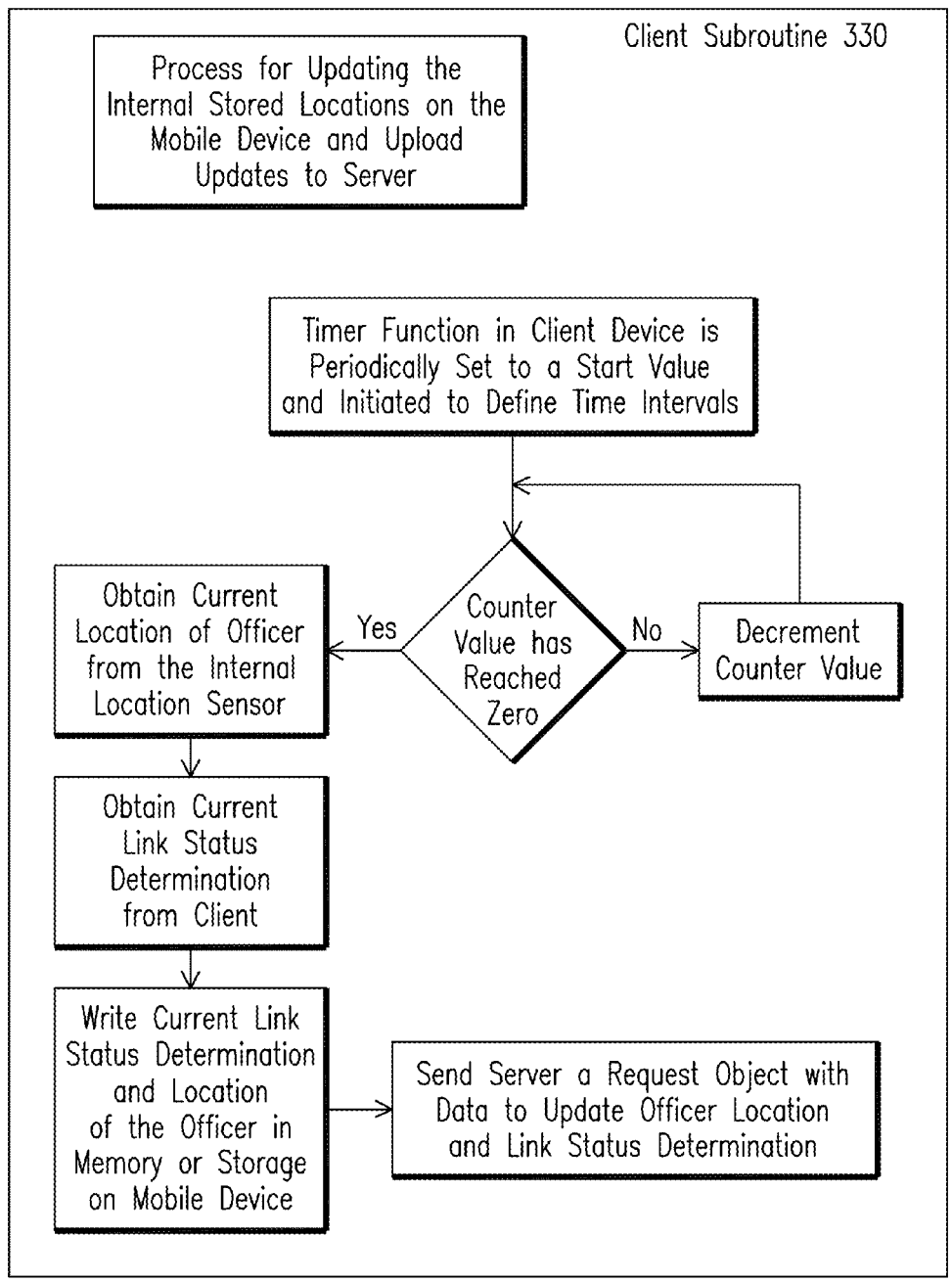
Figure 3D:
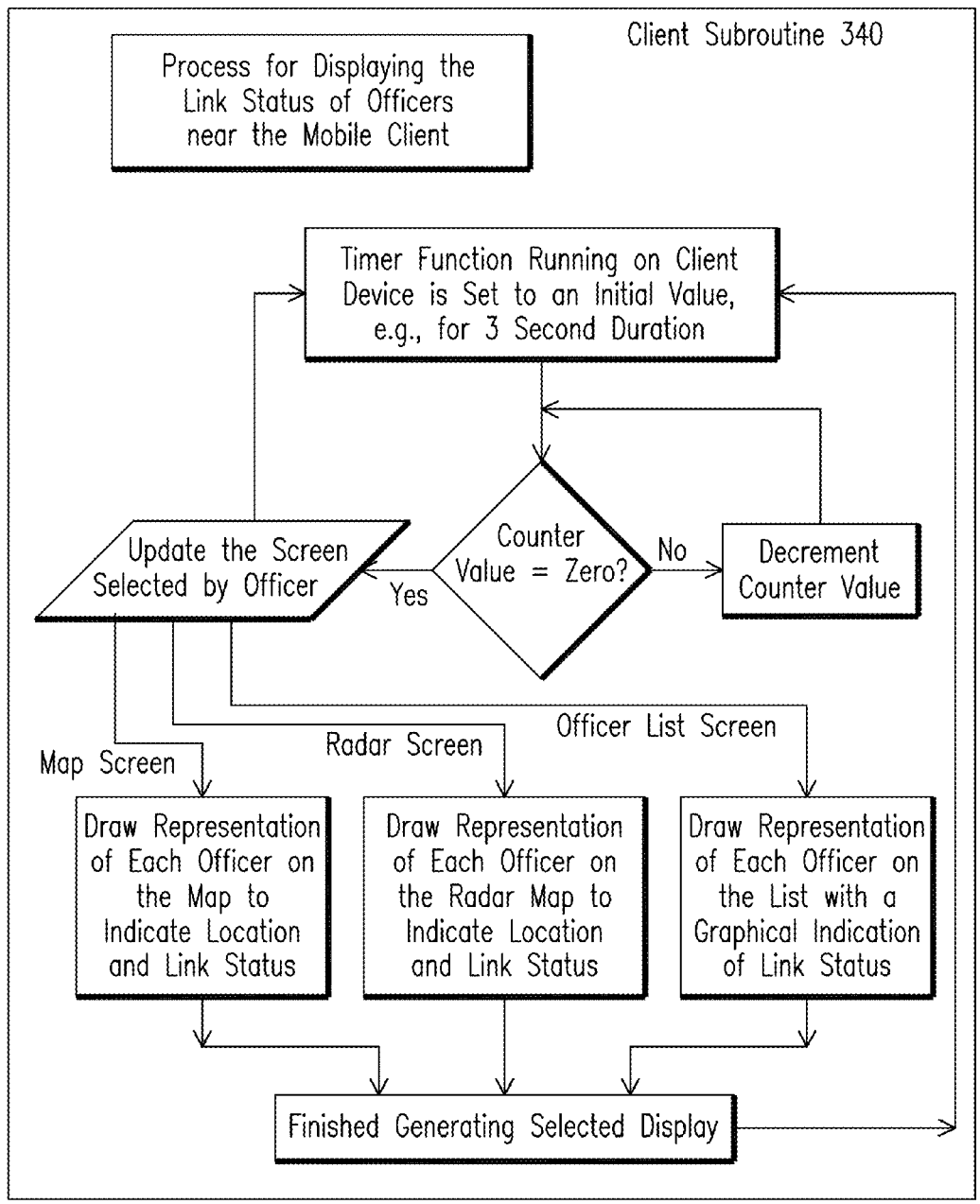

With reference to FIG. 3C the client subroutine 330 utilizes the timer function of client subroutine 320 to (i) periodically acquire the physical location of the officer based on, for example, GPS data acquired by the client device, and (ii) periodically obtain a current link status determination provided by the subroutine 320. With the counter set to a start value determinative of the predefined time interval, e.g., sixty seconds, the updated status of the link 8 (i.e., OIV Condition One or OOV Condition Two) and the updated location of the officer are periodically written to memory or storage. The updated status of the link is based on the most recently determined difference between the pre-existing value and the updated RSSI value. For example, on each occasion the counter value reaches zero, after the flag setting is updated to indicate the link status determination, the subroutine writes the most recently updated information in memory or storage media.

This periodically updated stored information is available for access in order to routinely send current information on link status and officer location to the server. At least whenever the client device determines that a transition has occurred between a Condition One link status and a Condition Two link status, the client subroutine 340 updates the officer location and the status of the logged in officer on the server. That is, a request object can be populated based on the information stored in memory. Alternately, each time the timer value is decremented to zero, the client device may send the officer location and link status to the server 12. The received information is used as an update to the officer's status and location information stored in the server database 40. Each update may provide the same status information as an immediately preceding update or may provide changes to the status information.

In the foregoing example, the client device provides updated information to the server. Generally, the client device may provide information to or request information from the server. When providing information to the server, such as an update to the officer's current location, the client device generates a Java request object, adds the current officer location information to the object, serializes the request object (i.e., the request object undergoes Java object serialization) and sends it to the server. Upon receipt, the server deserializes the data and updates the database 40 accordingly. The server then sends an empty Java response object to the client device. Upon receipt of the response object the client device closes the HTTP connection with the server.

A component software module of the client application 38, referred to as the Adjacent Officer Manager Service, runs in the background of the client device, periodically acquiring updates of information from the server. A process for generating and receiving requests for data, e.g., status and location updates for nearby officers, also involves generating a Java class "request object".

The Adjacent Officer Manager Service periodically requests updates for a list of nearby officer information for display on the client device. The requested updates are based on information periodically received by the server from each officer logged into the server application 34. See FIG. 3D in which subroutine 340 [FORMERLY CLIENT PROCESS 4] illustrates an example process for graphically displaying the status of the link 8 for other officers near a particular officer's mobile client device.

In order for the client device to obtain a list of nearby officers from the server, the client device generates a Java request object (i.e., that the server provide the list), serializes it and sends it to the server. Upon receipt, the server deserializes the request object and queries the database to identify nearby officers (according to specified criteria such as distance from the client device making the request). The server then builds a Java response object, populates it with link status and location data, serializes it and sends the response object to the client device which generated the request object. The client device deserializes the response object, closes the HTTP connection and processes the list of officers, e.g., to generate and display a list or a map of officer locations.

Figure 3E:
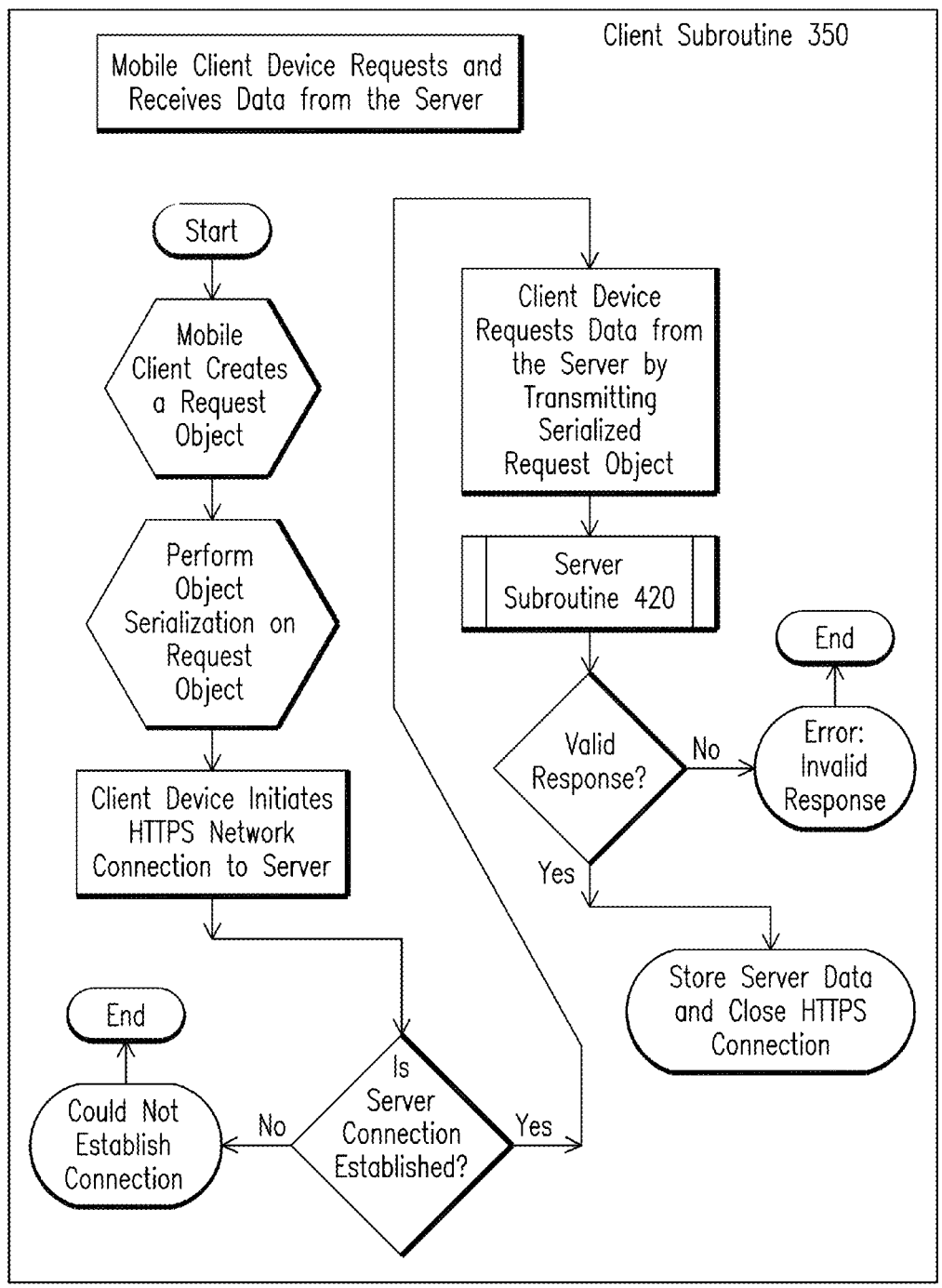

The client subroutine 350 of FIG. 3E illustrates a generic process in which the client device initiates data requests and receives data from the server. The request object is serialized, e.g., undergoes Java object serialization, and is assembled in memory as a data sequence or is stored as a file descriptive of the object and object type. Object serialization converts the message request so that it can be transmitted through an open network socket created by the client device and across the network 10 to the server 12 for receipt in the application 34. See, also, FIG. 4B in which the server subroutine 420 receives and responds to a request from one of multiple client devices for a most current list of nearby officers and associated graphic display data. When the mobile client devices request updated lists of nearby officers from the server, the information is used to update maps on the mobile devices, displayed lists of officers, and other components of the application 38 which utilize this information. This allows the mobile client devices to display timely information as to which officers are away from assigned or designated vehicles. Any client screens that display a list or map of other officers can be updated to display such officers in an identifiable way as being away from designated vehicles.

Once received by the server 12, the serialized message data is deserialized and reconverted into a Java request object for the server application 34. After the message is accepted by the server as a valid request, the server generates a list of logged in users from current information in the database 40, complete with the location and status of each officer. The list may be customized to limit the number of officers based on designated criteria, e.g., whether each officer is within a certain distance of the client device making the request. The server then creates a "response object" which is populated with a list of officers consistent with specified criteria, e.g., desired radius from the location of the requesting client device. The criteria may be set by the officer logged in to the client device. The server may also generate and populate the response object with image data that graphically illustrates relative locations of listed officers on maps (e.g., referred to as a map screen or a radar screen in client subroutine 340). However, such image data may be generated by the client device which receives the response object. The response object is serialized and sent back through the network socket on the server, across the network, and through the network socket on the client. The client device then deserializes and processes the data for display on the client device.

Figure 4A:
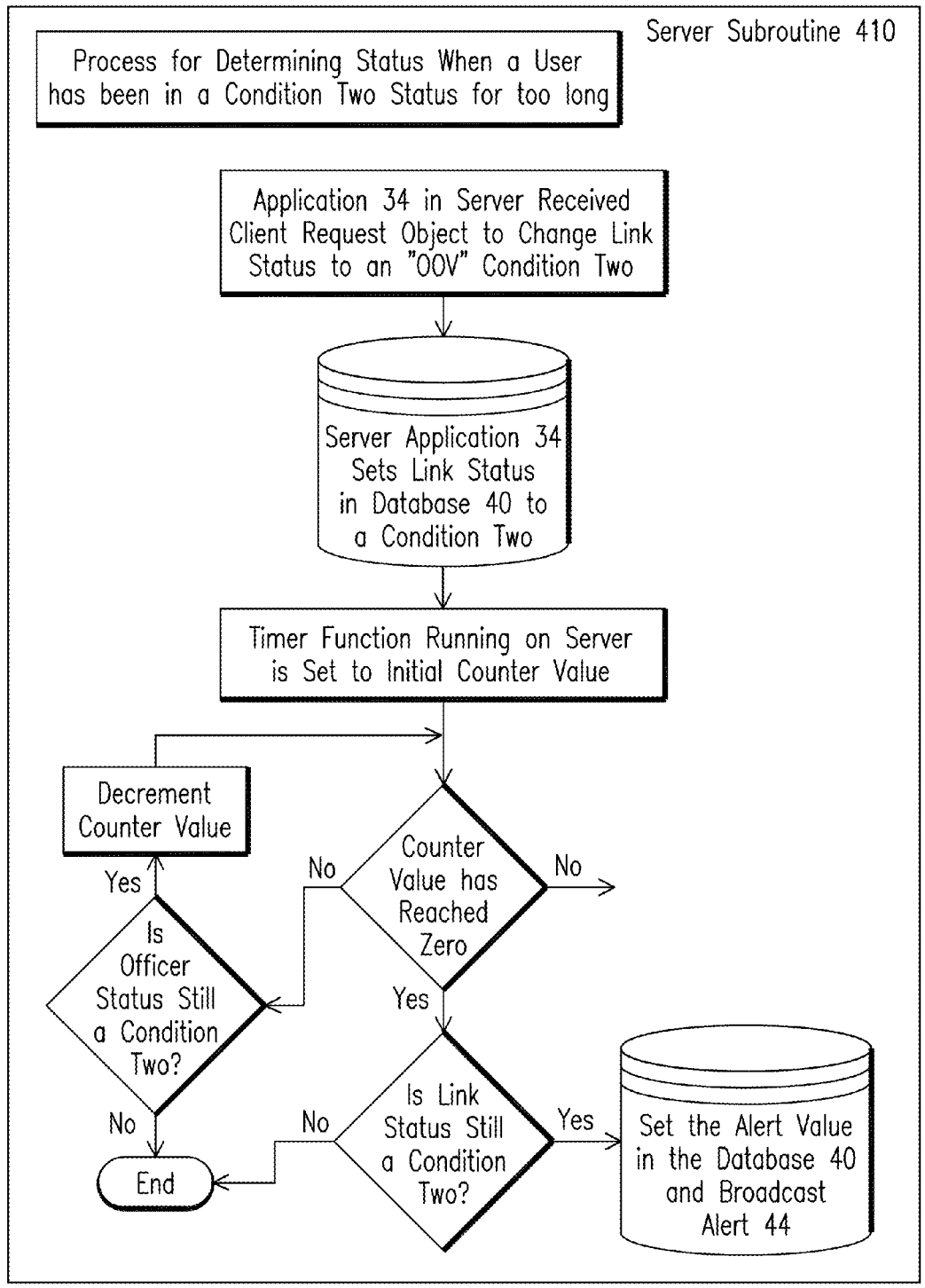
FIGS. 4A and 4B are simplified flow charts illustrating subroutine functions performed on a server in the system shown in FIGS. 1.
Figure 4B:
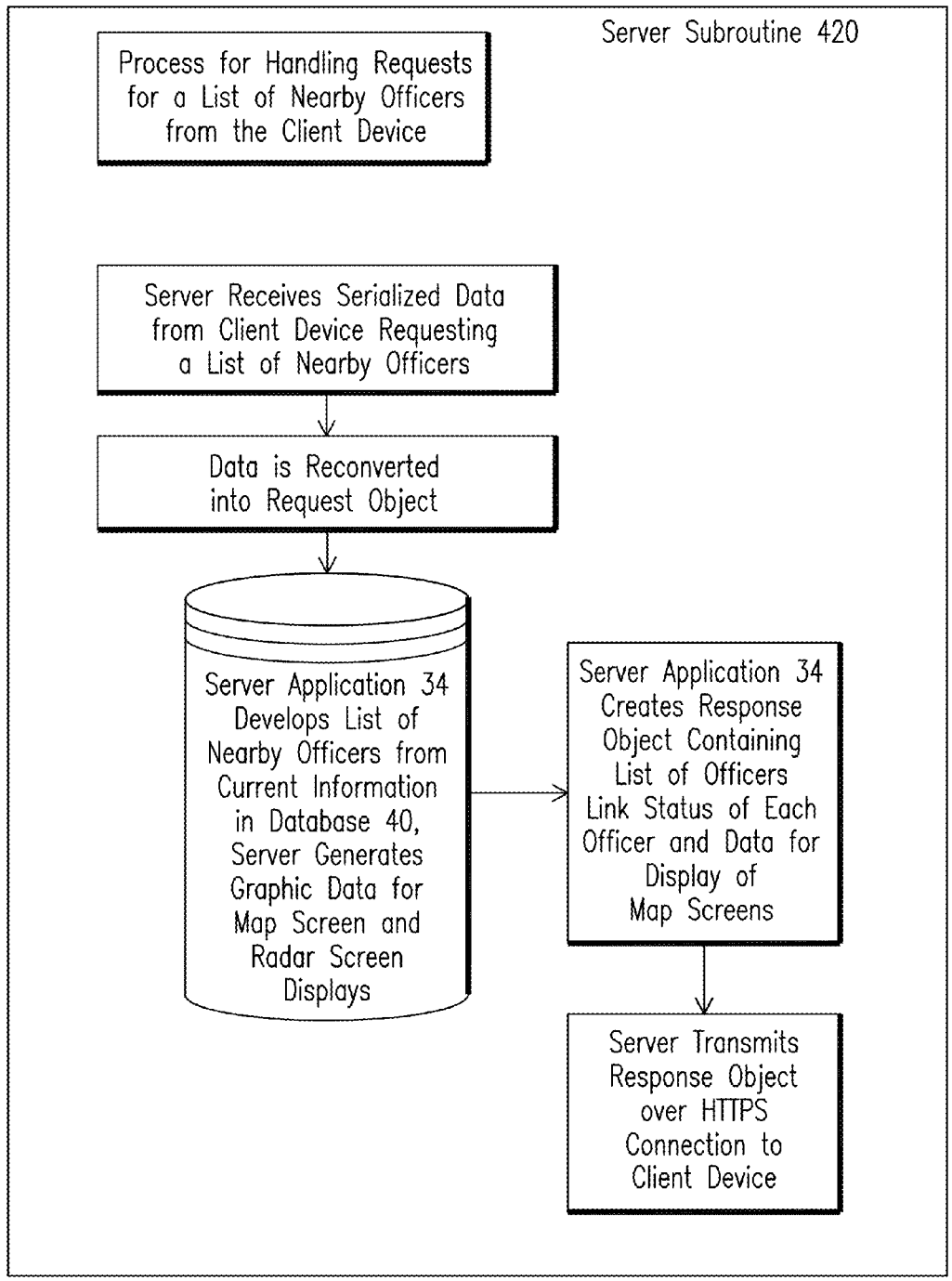
Figure 5A:
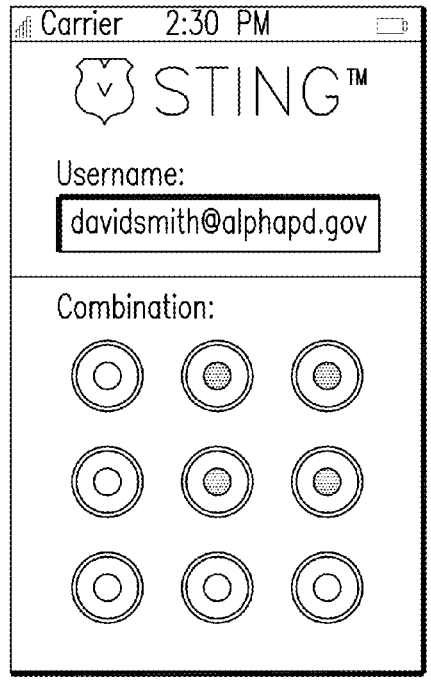
Figure 5B:
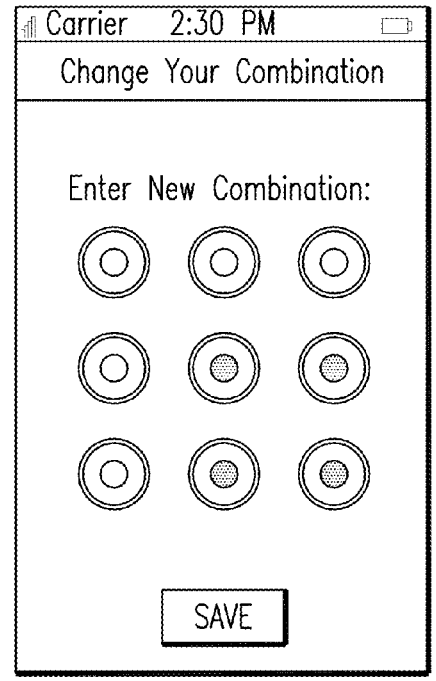
Figure 5C:
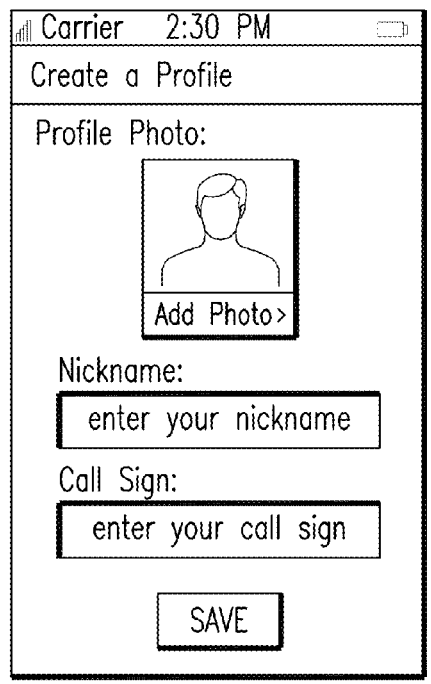
Figure 5D:
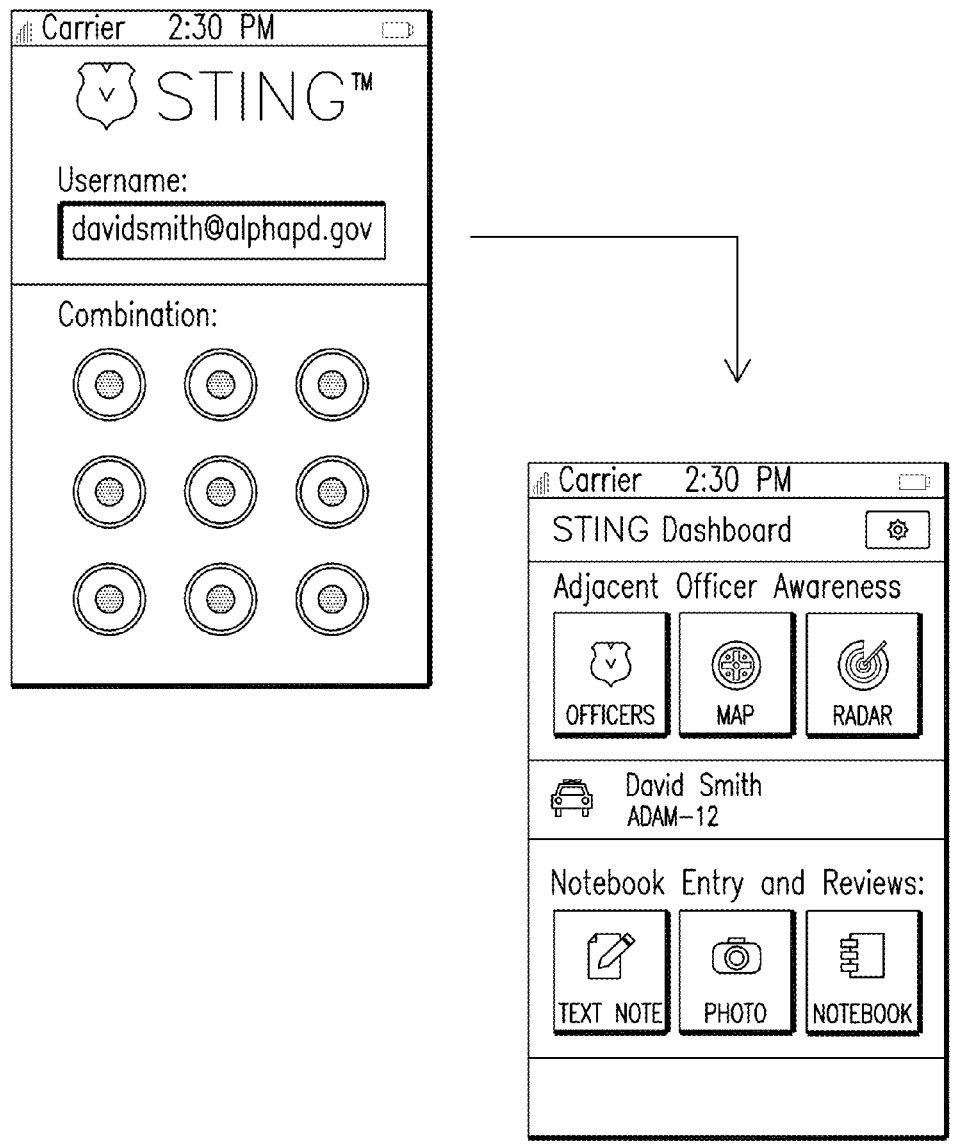
Figure 5H:
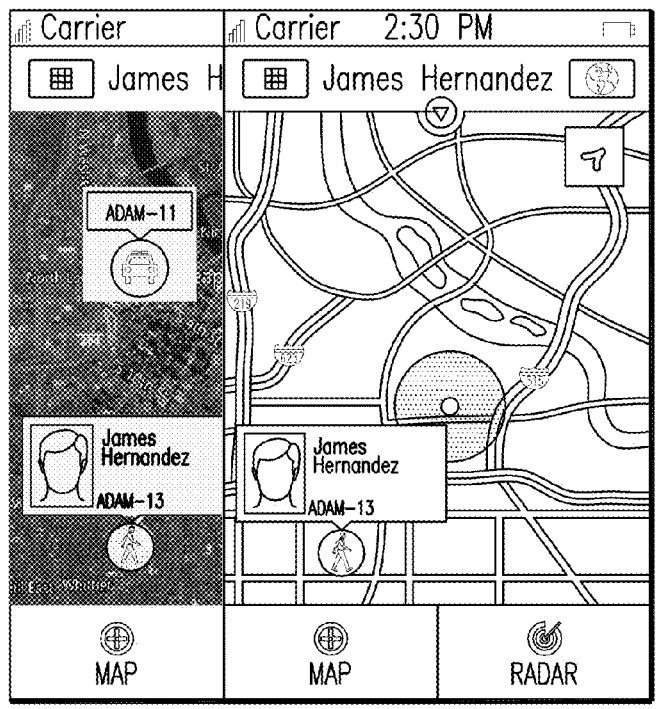
Figure 5I:
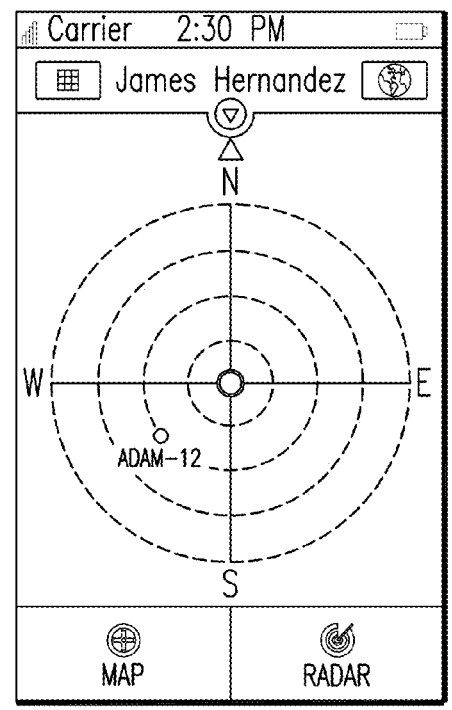

With further reference to FIG. 4A, upon receiving a request object from a client device containing an update to the link status, the server subroutine 410 updates the link status of the particular client device in the database 40. When the updated link status of the associated officer is an OOV Condition Two, a timer function resident in the server is initiated which will cancel if, during a designated time period, the officer returns to the vehicle, thereby once more creating a Condition One status. If the timer is not reset by the end of the designated timed period, an alert 44 is generated by the server 12 to advise others of the officer's OOV status. The alert is then broadcasted to announce that a specific officer has been out of a vehicle for too long. Any mobile clients then requesting an updated list of officers will receive the alert 44, indicating the current status of the officer as having transitioned from an initial OOV Condition Two to an alert advisory status because the officer has been away from the vehicle for a time exceeding the designated period.

FIG. 5 provide an exemplary sequence of illustrations showing the display of a hand-held device, such as the mobile telephone 18, according to an embodiment of the client application 38 running on the telephone 18. The sequence begins with display of a conventional gesture log-in screen having a pre-defined log in combination for a new user as shown in FIG. 5A. Once the new user logs in for the first time, the user is prompted to change the log in pattern from the pre-defined combination to another combination as indicated in FIG. 5B. Next, referring to FIG. 5C, the new user is prompted to select a Nickname and a Call Sign. The user may also add a picture. Once logged into the system, e.g., the hand-held device and the server, the user is taken to the menu screen shown in FIG. 5D. An upper row having three buttons provides situational awareness functionality in which the user may select presentation formats including (from left to right) an Officer List, a satellite view or street map view (not shown) or a Radar view.

The officer list presentation format shown in FIG. 5E provides names of all officers logged into the server sorted by distance from the user's telephone 18. This presentation format includes the officer's name, a picture, each officer's transportation mode and the call sign of the officer. The transportation mode is indicated by icons such as: a patrol car, a person on foot, a motor cycle, a bicycle or a horse.

In another display format, all logged in officers are displayed on a map screen as icons with their call signs. See FIG. 5F. The screen can either provide a satellite view or a street map view (not shown). When an icon is clicked, the system will display a pop-up containing the name and a picture of the officer as shown in the figure.

FIG. 5G illustrates display of a close-in Radar screen view of all officers within 1500 m of the user telephone 18, with the user positioned as though it is a radar beacon. The 1500 m range may be adjusted to a smaller radius by the user sliding a finger up and down on the screen. The radar view may be coupled to a phone compass to rotate the view about the telephone 18 and provide a correct orientation relative to true north, or to provide other desired orientations.

A single officer may be selected for display on a map, either from the officer list of FIG. 5E or from a map view, e.g., FIG. 5F (in street view or satellite view), by double clicking on an icon. The map only shows the positions of the user and the one officer the user has selected. This reduces clutter on the screen and renders it easier to locate the selected officer on the display. A button at the bottom of the screen enables the user to toggle between one of the map views and the radar view shown in FIG. 5I.

A system and a method have been described which can improve situational awareness of a person in possession of a handheld device having a link to another device. One of the two devices has a communications link over a network to a computer. The mobile client device may be a smart phone, e.g., such as the telephone 18, or a tablet computer including, but not limited to devices utilizing an Android operating system.

Although only a few example embodiments of the invention have been disclosed, many other embodiments will be apparent. For example, in lieu of providing an application in the mobile telephone 18 to determine whether a breakable link is broken, such a mobile application could reside in the PC 20 or in another beacon device having a stationary position within the vehicle 28 frame of reference. Execution of the application within the device which remains stationary with respect to the vehicle can perform the same function as a similar application running in the mobile telephone 18 or other hand held device. Further, two similar applications can run simultaneously (e.g., one in the telephone 18 and one in the PC 20) to provide for a level of redundancy. In this regard, there may be occasions when the stationary device (e.g., the PC 20) has a better connection to the network 10 than the device carried by the officer. When using the stationary device to transmit situational awareness information to the server 12, the stationary device may still be the transmitter and send information based on receipt of information from the portable device. In other embodiments, the stationary device may be the receiver running an application which sends an alert if a link has been broken. This may be a preferred arrangement if there is concern that situational awareness information about an officer carrying a hand held device may be lost if only the hand held device provides information to the server 12. It is also noted that when more than one person becomes associated with the same vehicle (e.g., when two or more officers are riding in the same patrol vehicle), a breakable link can be established between each telephone 18 (or other hand held device) in the possession of each person in the vehicle and the same PC 20 in the vehicle.

When implementing methods according to the invention, it will be recognized that different Bluetooth transceivers may exhibit significant variations in transmitted signal strength and signal detection sensitivity, e.g., on the order of 3 dB, and such variations may need to be accounted for in order to provide consistent determinations of OIV and OOV status.

The disclosed methods may be applied to determine how many times an officer enters and exits the vehicle while on duty. This information can be correlated with reported activities such as traffic stops and traffic citations issued during the officer's shift. By monitoring the average amount of time the officer is outside the car, it is, for example, to assess efficiency and effectiveness of an officer. The invention may be advantageously used in a variety of applications where security and safety of the person are to be monitored. The invention is also advantageously used when multiple persons are deployed in a field operation in order to conveniently assess the availability, location or status of individuals without having to initiate voice communications.

Although examples of the invention have been provided in the context of a law enforcement operation, methods and systems according to the invention could be applied to many other applications, including security operations, military operations and commercial contexts such as monitoring whether a driver of a transport vehicle has stepped out of the vehicle. Further, although the invention has been described in the context of a car, other types of vehicles, including motor cycles, can be provisioned with a Bluetooth transmitter in the vehicle frame of reference to provide improved situational awareness of an officer or other personnel based on movement away from the vehicle.

Accordingly the scope of the invention is only limited by the claims which now follow.

The claimed invention is:

1. A non-transitory computer readable medium containing program instructions representing software executable in a central monitoring system comprising a computer system including a microprocessor memory media and storage media and connected to a network, which instructions, when executed by the computer system, cause the computer system to perform method steps for monitoring the status of multiple persons in a group based on distance between a communications device associated with each person and one of multiple vehicles, each person in the group associated with one of the vehicles, the status indicative as to whether each person in the group has moved away from an associated vehicle or returned thereto, wherein each communications device is a first device in a pair of first and second devices, the first devices being carried by persons in the group while the second devices are each positioned at one of the associated vehicles, the method comprising:
receiving, by a central monitoring system comprising a processor, digital data from at least one member in each pair of devices in communication across a network with the processor of the central monitoring system, and processing the digital data received from the at least one member in each pair of devices, by:
identifying each communications device in each pair of devices;
associating the communications device in each pair of devices with a person in the group who is assigned to the communications device;
assimilating location status information from the data received from at least one member in each pair of devices, wherein the data is based on a distance between the devices in each pair derived from strength of a RF signal transmitted from one device in the pair toward the other device in the pair, the location status information indicative of persons in the group being in a first status when the person associated with the communications device in the pair has moved beyond a predetermined range of distance from the vehicle; and
outputting updated location status information to a display screen to provide notification when a person in the group is in the first status.

2. The non-transitory computer readable medium of claim 1 wherein execution of the program instructions by the computer system causes the computer system to receive the digital data from the at least one member in each pair of devices via a wireless network.

3. The non-transitory computer readable medium of claim 1 wherein the program instructions when executed by the computer system populate a data base that associates each portable device with a person assigned thereto.

4. The non-transitory computer readable medium of claim 1 wherein the program instructions, when executed by the computer system, associate the communications device in each pair of devices with a person in the group who is assigned to the communications device by accessing a database that associates each portable device with a respective person assigned thereto.

5. The non-transitory computer readable medium of claim 1 wherein, according to execution of the program instructions, the step of receiving digital data, including assimilating the data, is performed periodically to automatically place status information in a database and periodically update the database to provide new status information regarding movement of each person in the group with respect to an associated vehicle.

6. The non-transitory computer readable medium of claim 5 wherein, according to execution of the program instructions, the step of outputting location status information to a display screen to provide notification when a person in the group is in the first status is performed periodically to provide updated location status information to the display screen.

7. A non-transitory computer readable medium containing program instructions representing software executable in a central monitoring system comprising a computer system including a microprocessor memory media and storage media and connected to a network, which instructions, when executed by the computer system, cause the computer system to perform method steps for monitoring whether one or more persons in a group have each been away from an associated vehicle for longer than a predetermined time period, comprising:
  receiving into the computer system an association between each of multiple persons in the group with a vehicle;
  automatically receiving into the computer system digital information, derived from measured rf signal strength and sent via the network, indicating whether any one of multiple persons in the group has moved from a first relatively close position with respect to an associated vehicle and farther away from the associated vehicle than the first position;
  initiating a timer function in the computer system if the information the computer system receives indicates that a first of said multiple persons in the group has moved farther away from the associated vehicle than the first position;
  periodically receiving, into the computer system, updated information, also derived from measured rf signal strength, indicating whether the first of said multiple persons remains farther away from the associated vehicle than the first relatively close position or has moved to a position at least as close to the associated vehicle as the first relatively close position; and
  sending a notification from the computer system to at least one device associated with a second person in the group if, after a predefined time period determined with the timer function, the computer system determines, based on received updated information, that the first of said multiple persons remains farther away from the associated vehicle than the first relatively close position, the notification indicating that the first of said multiple persons has remained farther away from the associated vehicle than the first relatively close position during the entire predefined time period.

8. A non-transitory computer readable medium containing program instructions representing software executable in a central monitoring system comprising a computer system including a microprocessor memory media and storage media and connected to a network, which instructions, when executed by the computer system, cause the computer system to perform method steps for monitoring whether persons in a group are each away from an associated vehicle, comprising:
  receiving into the computer system an association between each of multiple persons in the group with one of multiple vehicles;
  automatically receiving into the computer system digital information, derived from measured rf signal strength via a network, indicating whether any one of multiple persons in the group has moved from a first relatively close position with respect to an associated vehicle and farther away from the associated vehicle than the first position; and
  sending a notification from the computer system to at least one device associated with a person in the group based on received information that a first of said multiple persons is farther away from the associated vehicle than the first relatively close position is from the associated vehicle.

9. The method of claim 8 wherein the step of associating each of the multiple persons in the group with a vehicle includes receiving into the computer system an association between a user identification for each of the multiple persons in the group and a MAC address of a device which transmits Bluetooth signals while located in the associated vehicle.

10. A non-transitory computer readable medium containing program instructions representing software executable in a central monitoring system comprising a computer system including a microprocessor memory media and storage media and connected to a network, which instructions, when executed by the computer system, cause the computer system to perform method steps for providing persons in a group status information and information about the whereabouts of other persons in the group, including whether persons in the group have moved away from an associated vehicle or returned to the vehicle, the method comprising:
  periodically receiving into a computer system information derived from measured rf signal strength and automatically sent in digital form via a cellular network from one or more portable devices, said information indicating whether any of the persons has moved from a first relatively close position with respect to an associated vehicle to beyond the first position and farther away from the associated vehicle than the first position;
  periodically receiving into the computer system, from the portable devices, location information sent via the network for multiple ones of the persons based on vehicle position
  periodically sending updated status information, from the computer system to each of the portable devices via the cellular network, for graphically indicating the location of each person on a map and indicating on the map whether each person
    (i) is at a first relatively close position with respect to an associated vehicle
    (ii) is beyond the first position and farther away from the associated vehicle than the first position.

11. The non-transitory computer readable medium of claim 10 wherein, according to the method steps implemented by the program instructions, the location information is periodically sent via the network for multiple ones of the persons based on when a person is at the first relatively close position with respect to the associated vehicle.

12. The non-transitory computer readable medium of claim 11 wherein, according to the method steps implemented by the program instructions, the status information is periodically sent to provide updates of the status information to each of the portable devices to graphically update the location of each person on a map and indicate on the map whether each person is beyond the first position and farther away from the associated vehicle than the first position.

13. The non-transitory computer readable medium of claim 10 wherein, according to the method steps implemented by the program instructions, the location information is periodically sent via the network for multiple ones of the persons based on vehicle position or based on when a person is in the first relatively close position with respect to the associated vehicle.

14. A non-transitory computer readable medium containing program instructions representing software executable on a computer system comprising a microprocessor and a memory medium and a storage medium, which instructions, when executed by the computer system, cause the computer system to perform method steps for automatically monitoring or notifying when one or more persons in a group move away from an associated vehicle or return toward the vehicle, the method comprising the steps of:

storing and providing access to modify a database in the computer system which identifies a plurality of portable communications devices, each configured to exchange data with the computer system, the database also associating each portable device with a person in the group assigned to have the device in his or her possession;

receiving into the data base position information, derived from a rf signal strength whenever sent from each portable communications device via the network, indicating whether the person, having possession of the portable device, has moved a distance away from the associated vehicle, the information including data indicating whether each person having possession of one of the portable communications devices is
      (i) in a first position relatively close to or within the associated vehicle or
      (ii) has moved away from the associated vehicle to a second position or
      (iii) has moved from the second position to the first relatively close position; and automatically sending, from the computer system to at least one device connected to receive data via the network, updated status information identifying each person in possession of a portable communications device who
    (i) has moved away from a first position relatively close to or within the associated vehicle to a second position; or
    (ii) has moved from the second position to the relatively close first position.

\* \* \* \* \*